United States Patent
Nakano et al.

(10) Patent No.: US 10,033,104 B2
(45) Date of Patent: *Jul. 24, 2018

(54) ANTENNA DEVICE AND WIRELESS COMMUNICATION DEVICE

(71) Applicant: Murata Manufacturing Co., Ltd., Nagaokakyo-shi, Kyoto-fu (JP)

(72) Inventors: Shinichi Nakano, Nagaokakyo (JP); Kuniaki Yosui, Nagaokakyo (JP); Noboru Kato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/685,199

(22) Filed: Aug. 24, 2017

(65) Prior Publication Data
US 2017/0352957 A1      Dec. 7, 2017

Related U.S. Application Data

(60) Continuation of application No. 14/937,970, filed on Nov. 11, 2015, now Pat. No. 9,768,511, which is a (Continued)

(30) Foreign Application Priority Data

May 21, 2012 (JP) .................................. 2012-115467
Sep. 14, 2012 (JP) .................................. 2012-202754

(51) Int. Cl.
*H01Q 7/08* (2006.01)
*H01Q 13/10* (2006.01)
(Continued)

(52) U.S. Cl.
CPC ........... *H01Q 7/08* (2013.01); *G06K 7/10178* (2013.01); *G06K 19/07794* (2013.01);
(Continued)

(58) Field of Classification Search
CPC ............... G06K 19/07794; G06K 7/10178
See application file for complete search history.

(56) References Cited

U.S. PATENT DOCUMENTS 9,768,511 B2 * 9/2017 Nakano ............... H01Q 1/2225
2012/0176282 A1 * 7/2012 Kato ................ G06K 19/07749
343/702

OTHER PUBLICATIONS

Nakano et al., "Antenna Device and Wireless Communication Device", U.S. Appl. No. 13/897,769, filed May 20, 2013.
(Continued)

*Primary Examiner* — Robert Karacsony
(74) *Attorney, Agent, or Firm* — Keating & Bennett, LLP

(57) ABSTRACT

An antenna device includes a feed coil and a sheet conductor. The feed coil includes a magnetic core and a coil-shaped conductor, which is provided around the magnetic core. An RFIC is connected to the feed coil. The sheet conductor has a larger area than the feed coil. A slit that extends from a portion of the edge of the sheet conductor toward the inner side of the sheet conductor is provided in the sheet conductor. The feed coil is arranged such that the direction of the axis around which the feed coil is disposed is parallel or substantially parallel to the directions in which the sheet conductor extends. The feed coil is arranged such that the feed coil is close to the slit and one of coil openings at the ends of the feed coil faces the slit.

16 Claims, 25 Drawing Sheets

Related U.S. Application Data division of application No. 13/897,769, filed on May 20, 2013, now Pat. No. 9,847,579.

(51) Int. Cl.
    *G06K 7/10*       (2006.01)
    *G06K 19/077*    (2006.01)
    *H01Q 1/22*      (2006.01)
    *H01Q 1/24*      (2006.01)

(52) U.S. Cl.
    CPC ......... *H01Q 1/2216* (2013.01); *H01Q 1/2225* (2013.01); *H01Q 1/243* (2013.01); *H01Q 13/106* (2013.01)

(56) References Cited

OTHER PUBLICATIONS

Nakano et al., "Antenna Device and Wireless Communication Device", U.S. Appl. No. 13/937,970, filed Nov. 11, 2015.

\* cited by examiner

ANTENNA DEVICE AND WIRELESS COMMUNICATION DEVICE

BACKGROUND OF THE INVENTION

1. Field of the Invention

The present invention relates to an antenna device preferably for use in a radio frequency identification (RFID) system or in a near field wireless communication system and to a wireless communication device that includes such an antenna device.

2. Description of the Related Art

Generally, for RFID in the 13.56 MHz band such as near field communication (NFC) used for mobile terminals, an RFID chip and a matching device are mounted on a circuit board, an antenna is attached to the inner side of a terminal housing made of resin, and the RFID chip and an antenna are connected via a spring pin or the like in a direct current (DC) manner.

Recent wireless communication devices such as mobile phone terminals have become thinner. In order to cope with insufficient strength due to such thinning, it is increasingly the case that strength is improved by using "more metal" when a housing is made. For example, a resin housing is coated with magnesium or a metal housing made of a material, such as aluminum or carbon fiber, is used.

However, when more metal" is used to make a housing, an antenna built into a terminal is shielded by the metal. Thus, a problem arises in that communication may not be able to be performed with another device.

As a result, antenna devices have been proposed in Japanese Unexamined Patent Application Publication No. 2011-97657 and Japanese Unexamined Patent Application Publication No. 2011-249935. The antenna devices have a structure in which a metal plate, which has a larger area than an antenna coil, is used as a radiation plate by being arranged to be close to the antenna coil (magnetic-field coupling).

However, the antenna devices described in Japanese Unexamined Patent Application Publication No. 2011-97657 and Japanese Unexamined Patent Application Publication No. 2011-249935 have the following problems.

FIG. 25 is a plan view of an antenna device described in Japanese Unexamined Patent Application Publication No. 2011-97657. A conductor opening CA and a slit 2S are provided in a sheet conductor 2. A coil opening of a coil-shaped conductor 31 is arranged so as to overlap the conductor opening CA. When current flows in the coil-shaped conductor 31 in the directions indicated by arrows drawn with a solid line, a current that flows in the sheet conductor 2 in the directions indicated by arrows drawn with a broken line is induced. In FIG. 25, the current that flows in the coil-shaped conductor 31 and the current that flows in the sheet conductor 2 flow in the same direction in areas A1, A2, A3, and A4. However, the current that flows in the coil-shaped conductor 31 and the current that flows in the sheet conductor 2 flow in opposite directions in an area B. In this manner, when there is an area in which the directions of currents are opposite, the inductance of an antenna (a capacitor) is reduced and communication characteristics are degraded, which is a problem. Moreover, the amount of induced current changes in accordance with positions in which the coil-shaped conductor 31 and the sheet conductor 2 are attached and variations in distance between the coil-shaped conductor 31 and the sheet conductor 2 when they are attached. Thus, variations in inductance tend to occur, which is a problem.

SUMMARY OF THE INVENTION

Preferred embodiments of the present invention provide an antenna device that overcomes the problems described above, such as a reduction in inductance of an antenna device when viewed from a feeder circuit and variations in inductance and a wireless communication device that includes such an antenna device.

An antenna device according to a first preferred embodiment of the present invention includes a feed coil that includes a coil-shaped conductor, and a sheet conductor, which preferably has a sheet shape. The sheet conductor preferably has a larger area than the feed coil. A slit that extends from a portion of the edge of the sheet conductor towards an inner side of the sheet conductor is provided in the sheet conductor or an opening and the slit are provided in the sheet conductor, the opening being connected to the slit. The feed coil is arranged such that the direction of the axis around which the coil-shaped conductor is disposed differs from a direction perpendicular or substantially perpendicular to the sheet conductor. The feed coil is arranged such that a coil opening at one end of the coil-shaped conductor is close to the slit or a portion of the edge of the opening and the coil opening faces the slit or the portion of the edge of the opening.

An antenna device according to a second preferred embodiment of the present invention includes a feed coil that includes a coil-shaped conductor, and a sheet conductor. The sheet conductor includes a plurality of sheet conductors and a slit is provided or an opening and the slit are provided between adjacent sheet conductors of the plurality of sheet conductors, the opening being connected to the slit. The total area of the plurality of sheet conductors and slit is preferably larger than the area of the feed coil. The feed coil is arranged such that the direction of the axis around which the coil-shaped conductor is disposed differs from at least a direction perpendicular or substantially perpendicular to one of the plurality of sheet conductors, the sheet conductor being closest to the feed coil. The feed coil is arranged such that a coil opening at one end of the coil-shaped conductor is close to the slit or a portion of the edge of the opening and the coil opening faces the slit or the portion of the edge of the opening.

In the structures described in the first and second preferred embodiments, "close" refers to a range in which a communication distance obtained by using the feed coil and the sheet conductor is greater than a communication distance obtained only by using the feed coil. With this structure, there is substantially no area in which the current that flows in the feed coil and the current that flows in the sheet conductor flow in opposite directions. Thus, there are no problem, such as a reduction in inductance of an antenna and a variation in inductance.

According to a third preferred embodiment of the present invention, the plurality of sheet conductors are preferably connected to each other in a direct current manner and are at the same potential. With this structure, the plurality of sheet conductors function as shield conductors.

According to a fourth preferred embodiment of the present invention, the antenna device may preferably include a plurality of sheet conductors that include a first conductor surface and a second conductor surface that face each other, and may preferably include a first connection unit that electrically and directly connects the first conductor surface with the second conductor surface and a second connection unit that connects the first conductor surface with the second conductor surface via a first capacitor. With this structure, coupling occurs between the feed coil and the first conductor surface and a space between the first conductor surface and the second conductor surface functions as an opening. Thus, the first and second conductor surfaces may be used as radiation elements without a slit or an opening being provided in a conductor surface.

According to a fifth preferred embodiment of the present invention, the feed coil may preferably have a multilayer structure in which a plurality of insulator layers (for example, magnetic layers, dielectric layers, or layers made by mixing a dielectric material and a magnetic material) on which a conductor that defines an inductor is provided and a plurality of insulator layers (for example, magnetic layers, dielectric layers, or layers made by mixing a dielectric material and a magnetic material) on which a conductor that defines a capacitor is provided are stacked, and the first capacitor may be the capacitor that the feed coil includes. With this structure, a capacitor element is not required to connect the first and second conductor surfaces. Thus, a capacitor may be built into the antenna without increasing the size thereof, and consequently, space savings on the circuit board is achieved.

According to a sixth preferred embodiment of the present invention, the slit may preferably include at least one bent portion. With this structure, a high degree of flexibility in the arrangement position and orientation of the feed coil with respect to the sheet conductor is provided.

According to a seventh preferred embodiment of the present invention, the axis around which the coil-shaped conductor is disposed is preferably arranged so as to be perpendicular or substantially perpendicular to the direction in which the slit extends or to a portion of the edge of the opening. With this structure, coupling most efficiently occurs for the feed coil through a magnetic field generated by a current that flows along the edge of the slit or opening.

According to an eighth preferred embodiment of the present invention, the sheet conductor preferably includes a resonant circuit that is primarily defined by the slit or the edge of the opening. The resonant frequency of the resonant circuit is preferably the same or substantially the same as the resonant frequency of a circuit that includes the feed coil. With this structure, the radiation efficiency due to the sheet conductor is increased.

According to a ninth preferred embodiment of the present invention, at least a portion of the sheet conductor is preferably defined by a metal housing. With this structure, there is no need to provide a dedicated component as a sheet conductor. Thus, the number of components is reduced.

According to a tenth preferred embodiment of the present invention, at least a portion of the sheet conductor is preferably defined by a ground conductor provided on a circuit board. With this structure, there is no need to provide a dedicated component as a sheet conductor. Thus, the number of components is reduced.

A wireless communication device according to an eleventh preferred embodiment of the present invention includes the antenna device according to the first preferred embodiment of the present invention and a communication circuit connected to the antenna device.

A wireless communication device according to a twelfth preferred embodiment of the present invention includes the antenna device according to the second preferred embodiment of the present invention and a communication circuit connected to the antenna device.

According to various preferred embodiments of the present invention, an antenna device that does not experience a reduction in inductance and/or a variation in inductance and a wireless communication device that includes the antenna device are provided. This is because there is substantially no area in which the current that flows in the feed coil and the current that flows in the sheet conductor flow in opposite directions.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
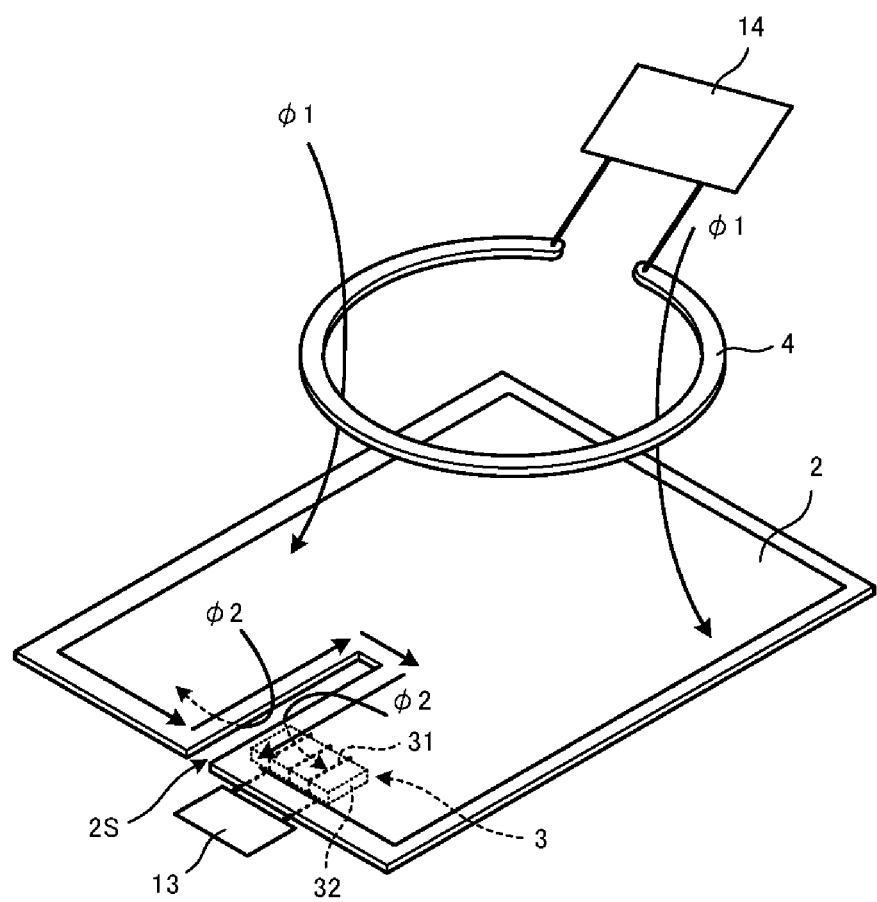
FIG. 1 is a perspective view of an antenna device according to a first preferred embodiment of the present invention and an antenna coil with which the antenna device performs communication.

FIG. 1 is a perspective view of an antenna device according to a first preferred embodiment of the present invention and an antenna coil with which the antenna device performs communication. The antenna device includes a feed coil 3 and a sheet conductor 2. The feed coil 3 includes a magnetic core 32 and a coil-shaped conductor 31, which is arranged around the magnetic core 32. The coil-shaped conductor 31 may preferably be a conducting wire (a wound conductor wire) wound around the magnetic core 32 or may be a conductor pattern provided in a multilayer body including a plurality of stacked dielectric layers, a multilayer body including a plurality of stacked magnetic layers, or a multilayer body including one or more dielectric layers and one or more magnetic layers that are stacked on one another. In particular, the feed coil 3 is preferably a chip-type feed coil that includes, as the coil-shaped conductor 31, a coil-shaped conductor including an in-plane conductor pattern and an interlayer conductor pattern in a multilayer body including a plurality of stacked magnetic layers (for example, ferrite ceramic layers) since a chip-type feed coil, which is relatively small and may be surface-mounted, may be provided.

A radio-frequency integrated circuit (RFIC) 13, which is a feeder circuit, is connected to the feed coil 3. That is, one end and the other end of the coil-shaped conductor 31 are connected to two input-output terminals of the RFIC 13. In the first preferred embodiment, the RFIC 13 is preferably an RFIC chip for near field communication (NFC) and is a semiconductor IC chip that processes high-frequency signals for NFC, for example.

The sheet conductor 2 preferably has a larger area than the feed coil 3. That is, when viewed in a direction perpendicular or substantially perpendicular to the sheet conductor 2, the sheet conductor 2 preferably has larger outer dimensions than the feed coil 3. The sheet conductor 2 includes a slit 2S that extends from a portion of a side of the sheet conductor 2 towards the inner side of the sheet conductor 2. In the first preferred embodiment, the slit 2S preferably has a constant width from one end to the other end thereof. However, the width does not necessarily have to be constant.

In this example, the sheet conductor 2 is a metal housing portion (a metal cover portion) of a communication terminal housing. In a state illustrated in FIG. 1, the feed coil 3 is arranged under the sheet conductor 2, in the communication terminal housing. The feed coil 3 is arranged such that the direction of the axis around which the coil-shaped conductor 31 is disposed differs from a direction perpendicular or substantially perpendicular to the sheet conductor 2. More specifically, the feed coil 3 is arranged such that the direction of the axis around which the coil-shaped conductor 31 is disposed is parallel or substantially parallel to the directions in which the sheet conductor 2 extends. Note that the direction of the axis around which the coil-shaped conductor 31 is disposed does not have to be exactly parallel to the directions in which the sheet conductor 2 extends. The axis around which the coil-shaped conductor 31 is disposed is preferably ±45° or less with respect to the directions in which the sheet conductor 2 extends.

Moreover, the feed coil 3 is arranged such that one of coil openings at the ends of the feed coil 3 is close to the slit 2S and faces the slit 2S (the "coil openings at the ends of the feed coil 3" are hereinafter simply referred to as "coil openings of the feed coil 3"). That is, the feed coil 3 is arranged such that the magnetic flux that passes through the slit 2S of the sheet conductor 2 passes through the coil opening, that is, the feed coil 3 is arranged such that the coil opening may be seen from the slit 2S.

The sheet conductor 2 does not necessarily have to be a metal housing portion and may be a conductive film provided on an insulating base or a conductor layer provided in an insulating base. That is, the sheet conductor 2 may preferably be a ground conductor mounted in a communication terminal, various types of metal plate, such as a metal chassis, a shield case, or a metal cover of a battery pack, or a flat pattern of a metal thin film provided on a flexible sheet, for example. In the case in which the sheet conductor 2 is a metal thin film pattern provided on a flexible sheet, the sheet conductor 2 is preferably attached to the inner side of the back cover of a communication terminal by using an adhesive, for example. Note that the sheet conductor 2 is preferably a conductor that is substantially sheet-shaped, and the sheet conductor 2 does not have to be flat, and may be curved.

As illustrated in FIG. 1, an RFIC 14 is connected to an antenna coil 4, with which communication is performed. When the sheet conductor 2 is close to the antenna coil 4, an induced current is generated in the sheet conductor 2 and flows primarily along the edge of the sheet conductor 2 due to the cut-edge effect. That is, current (an eddy current) flows in a direction such that the current flowing in that direction prevents magnetic flux generated by the antenna coil 4 from passing through the antenna coil 4. In FIG. 1, magnetic flux that passes through the antenna coil 4 is denoted by ϕ1. The slit 2S is defined by a portion of the edge of the sheet conductor 2, and a current density is high in a portion along the edge of the slit 2S. As the width of the slit 2S is decreased, the magnetic force near the slit 2S increases.

In FIG. 1, magnetic flux that passes through the slit 2S is denoted by φ2. A portion of the magnetic flux φ2 enters the feed coil 3. Note that a magnetic field is also generated by a current that flows along the edge portion of the periphery of the sheet conductor 2. However, strong coupling occurs for the feed coil 3 primarily through a magnetic field near the slit 2S since the feed coil 3 is sufficiently spaced apart from the edge portion of the periphery of the sheet conductor 2. The magnetic-field coupling described above is not cancelled by magnetic-field coupling occurring through a magnetic field near the end portion of the periphery of the sheet conductor 2.

As described above, the sheet conductor 2 functions as a magnetic-field capturing element (a radiation plate) and magnetic-field coupling occurs between the feed coil 3 and the antenna coil 4, with which communication is performed, via the sheet conductor 2. Moreover, the coil openings of the coil-shaped conductor 31 of the feed coil 3 do not face the sheet conductor 2 and only a portion of the coil-shaped conductor 31 is close to the sheet conductor 2. Furthermore, when viewed in the direction of the axis around which the coil-shaped conductor 31 is disposed, the coil-shaped conductor 31 includes a portion near the sheet conductor 2 and a portion spaced away from the sheet conductor 2. Thus, the inductance of the feed coil 3 does not significantly change even when a positional relationship between the feed coil 3 and the sheet conductor 2 changes to a certain degree. Therefore, the antenna devices may have small manufacturing variations.

The feed coil 3 is preferably arranged such that one of the coil openings of the feed coil 3 faces the slit 2S. As illustrated in FIG. 1, the direction of the axis around which the coil-shaped conductor 31 of the feed coil 3 is disposed (hereinafter also referred to as the axis of the feed coil 3) is preferably perpendicular or substantially perpendicular to the direction in which the slit 2S extends (that is, to the direction of the longer side of the slit 2S), and coupling occurs with a high degree of efficiency for the feed coil 3 through the magnetic flux φ2 generated at the slit 2S.

Figure 2A:
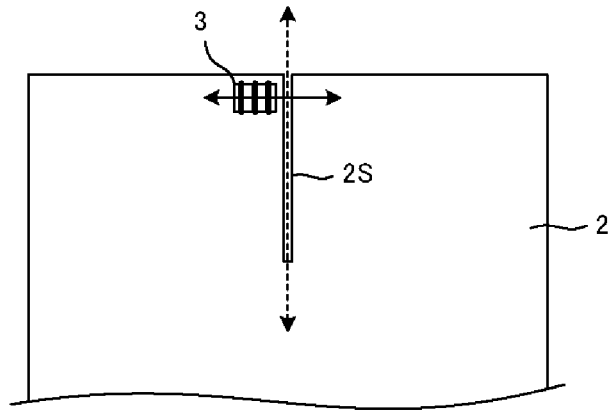
FIGS. 2A to 2C are diagrams illustrating relationships between a slit and a feed coil in terms of position, orientation, and coupling strength.
Figure 2B:
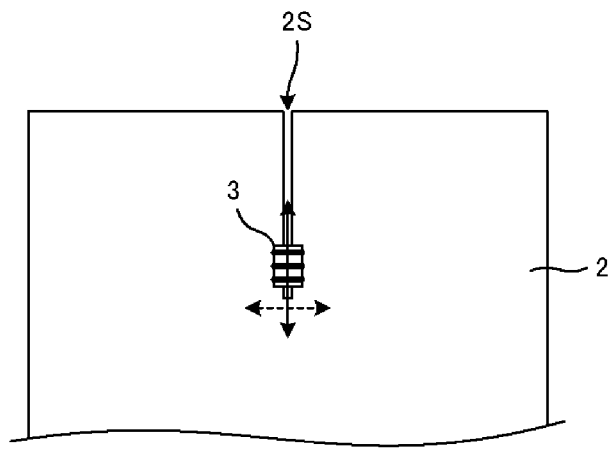
Figure 2C:
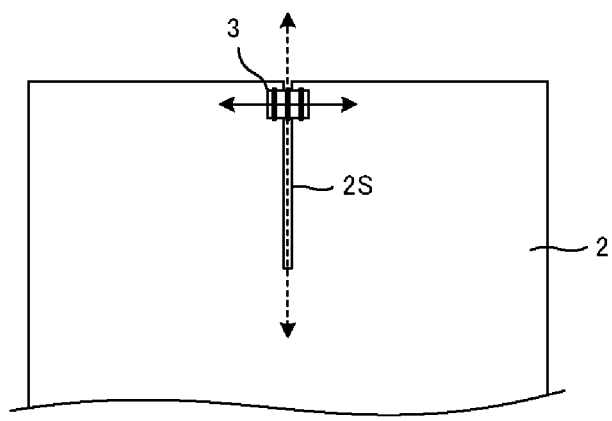

FIGS. 2A to 2C are diagrams illustrating relationships between the slit 2S and the feed coil 3 in terms of position, orientation, and coupling strength. In FIGS. 2A to 2C, double-headed arrows drawn with a solid line represent the axis of the feed coil 3. In FIGS. 2A and 2C, double-headed arrows drawn with a broken line represent the direction in which the slit 2S extends. In FIG. 2B, a double-headed arrow drawn with a broken line represents the width direction of the slit 2S (or the direction of the shorter side of the slit 2S).

Similarly to the first preferred embodiment illustrated in FIG. 1, FIG. 2A illustrates an example in which the feed coil 3 is arranged such that one of the coil openings of the feed coil 3 faces the slit 2S and the direction of the axis of the feed coil 3 is perpendicular or substantially perpendicular to the direction in which the slit 2S extends. With this structure, strong coupling between the feed coil 3 and the sheet conductor 2 occurs through the magnetic field generated at the slit 2S.

FIG. 2B illustrates an example in which the feed coil 3 is arranged such that one of the coil openings of the feed coil 3 faces a closed end, which is in the sheet conductor 2, of the slit 2S and the direction of the axis of the feed coil 3 is perpendicular or substantially perpendicular to the width direction of the slit 2S. With this structure, coupling occurs for the feed coil 3 through the magnetic field generated by a current that flows along the closed end of the slit 2S. Thus, although coupling strength is weak, coupling between the feed coil 3 and the sheet conductor 2 occurs.

FIG. 2C illustrates an example in which the feed coil 3 is arranged such that the coil openings of the feed coil 3 face both sides of the sheet conductor 2 with respect to the slit 2S and the direction of the axis of the feed coil 3 is perpendicular or substantially perpendicular to the direction in which the slit 2S extends. With this structure, for the feed coil 3, coupling occurs through a magnetic field generated by current that flows along one side of the slit 2S and through a magnetic field generated by current that flows along another side of the slit 2S, the one side and the other side of the slit 2S facing each other. The direction of the magnetic field generated at the one side of the slit 2S is opposite to the direction of the magnetic field generated at the other side of the slit 2S. Thus, for the feed coil 3, coupling through the magnetic field at the one side of the slit 2S and coupling through the magnetic field at the other side of the slit 2S balance each other out. Therefore, coupling does not occur between the feed coil 3 and the sheet conductor 2.

Thus, the feed coil 3 is preferably arranged such that one of the coil openings of the feed coil 3 faces the slit 2S and the direction of the axis of the feed coil 3 is perpendicular or substantially perpendicular to the direction in which the slit 2S extends.

Second Preferred Embodiment

Figure 3:
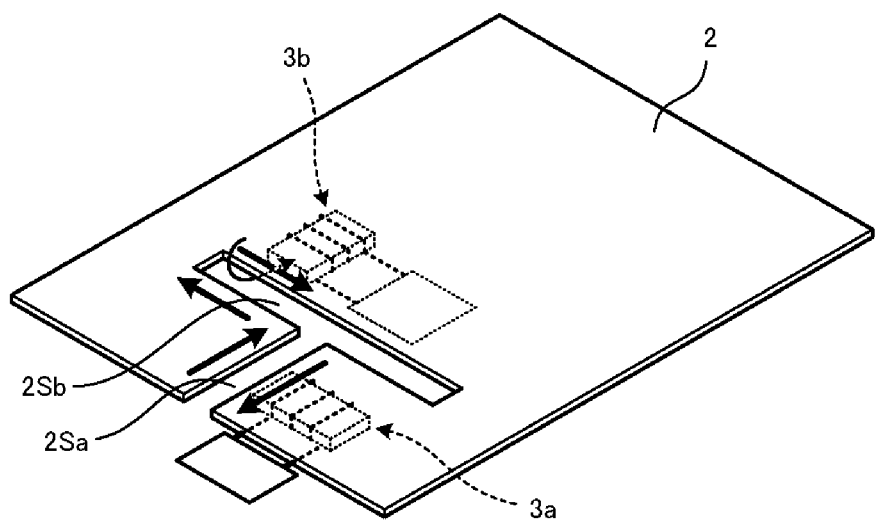
FIG. 3 is a perspective view of an antenna device according to a second preferred embodiment of the present invention.

FIG. 3 is a perspective view of an antenna device according to a second preferred embodiment of the present invention. In this example, a slit provided in the sheet conductor 2 includes slit portions 2Sa and 2Sb, the direction in which the slit portion 2Sa extends being perpendicular or substantially perpendicular to the direction in which the slit portion 2Sb extends. That is, the slit includes a bent portion. A feed coil 3a is preferably arranged such that one of coil openings of the feed coil 3a faces the slit portion 2Sa and the direction of the axis around which the feed coil 3a is disposed is perpendicular or substantially perpendicular to the direction in which the slit portion 2Sa extends. Thus, strong coupling occurs for the feed coil 3a through a magnetic field generated at the slit portion 2Sa. Moreover, a feed coil 3b is preferably arranged such that one of coil openings of the feed coil 3b faces the slit portion 2Sb and the direction of the axis around which the feed coil 3b is disposed is perpendicular or substantially perpendicular to the direction in which the slit portion 2Sb extends. Thus, strong coupling occurs for the feed coil 3b through a magnetic field generated at the slit portion 2Sb.

In this example, two feed coils 3a and 3b are preferably provided. However, only one of the feed coils 3a and 3b may also be provided. Moreover, these two feed coils 3a and 3b may be connected in series or in parallel. Additionally, three or more feed coils may be provided.

Figure 4:
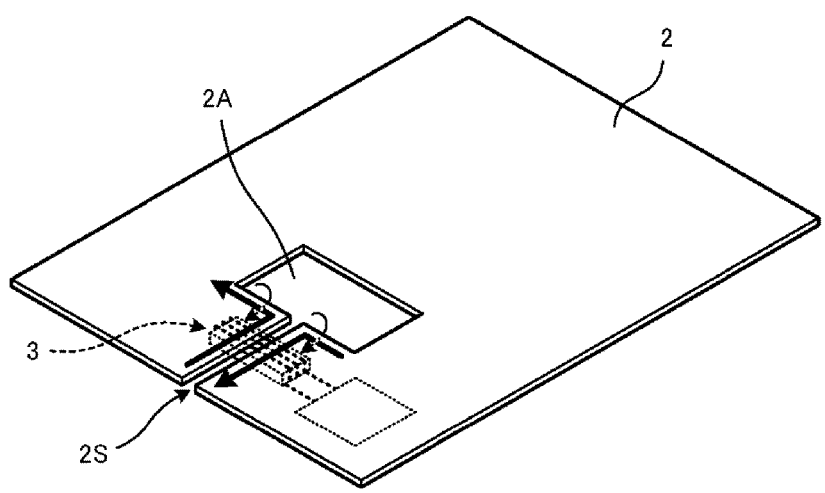
FIG. 4 is a perspective view of another antenna device according to the second preferred embodiment of the present invention.

FIG. 4 is a perspective view of another antenna device according to the second preferred embodiment. In this example, the slit 2S and an opening 2A are provided in the sheet conductor 2. The feed coil 3 is arranged such that the feed coil 3 is close to the opening 2A and one of the coil openings of the feed coil 3 faces the opening 2A. Thus, strong coupling occurs for the feed coil 3 through a magnetic field generated at the edge of the opening 2A. Note that the feed coil 3 is not affected by the slit 2S since the direction of the axis of the feed coil 3 is perpendicular or substantially perpendicular to the direction of a magnetic field generated near the slit 2S. Moreover, a magnetic field is generated by a current that flows along the edge portion of the periphery of the sheet conductor 2. However, strong coupling occurs for the feed coil 3 primarily through a magnetic field near the opening 2A since the feed coil 3 is provided closer to the opening 2A than to the edge portion of the periphery of the sheet conductor 2. The magnetic-field coupling described above is not cancelled by magnetic-field coupling occurring through a magnetic field near the end portion of the periphery of the sheet conductor 2.

Figure 5A:
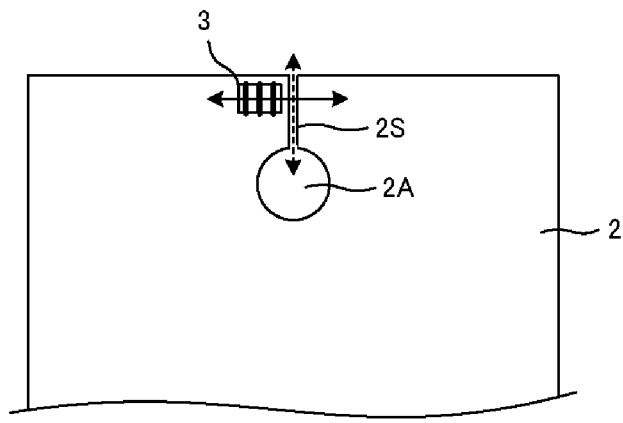
FIGS. 5A to 5C are diagrams illustrating states of coupling between the feed coil and a sheet conductor for another antenna device according to the second preferred embodiment of the present invention.
Figure 5B:
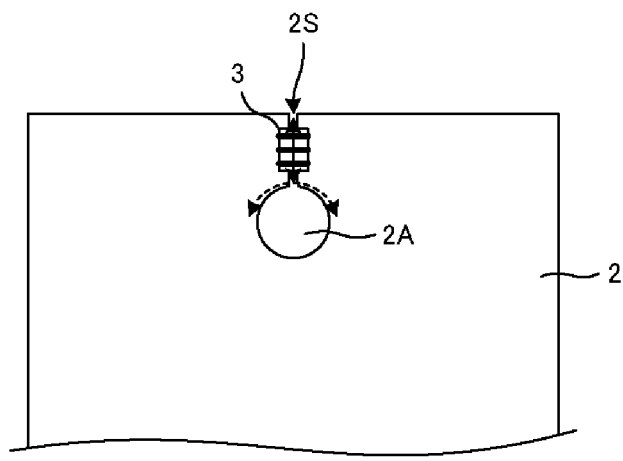
Figure 5C:
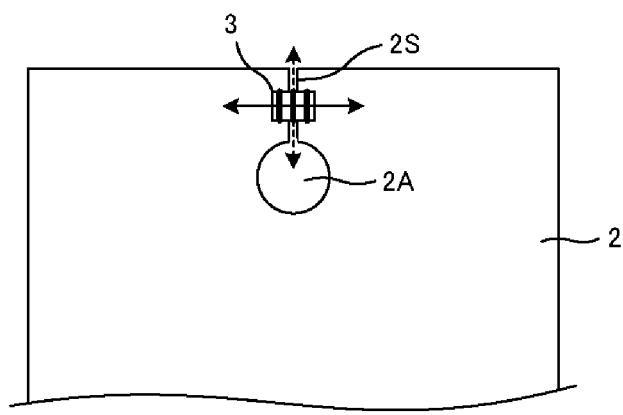

FIGS. 5A to 5C are diagrams illustrating states of coupling between the feed coil 3 and the sheet conductor 2 for another antenna device according to the second preferred embodiment. The slit 2S and the opening 2A are provided in the sheet conductor 2 of this antenna device, the width of the slit 2S being different from that of the opening 2A. In FIGS. 5A to 5C, double-headed arrows drawn with a solid line represent the axis of the feed coil 3. In FIGS. 5A and 5C, double-headed arrows drawn with a broken line represent the direction in which the slit 2S extends. In FIG. 5B, a double-headed arc-shaped arrow drawn with a broken line represents the direction of a current that flows along the opening 2A.

In an example illustrated in FIG. 5A, strong coupling occurs for the feed coil 3 through a magnetic field generated near the slit 2S. In an example illustrated in FIG. 5B, strong coupling occurs for the feed coil 3 through a magnetic field near the feed coil 3 from among a magnetic field generated near the opening 2A. In an example illustrated in FIG. 5C, for the feed coil 3, coupling through a magnetic field at one side of the slit 2S and coupling through a magnetic field at another side of the slit 2S balance each other out, the magnetic fields being generated by a current that flows along the edge of the slit 2S. This is because the direction of the magnetic field at the one side of the slit 2S is opposite to the direction of the magnetic field at the other side of the slit 2S, the one side and the other side of the slit 2S facing each other. Moreover, the direction of the axis of the feed coil 3 is perpendicular or substantially perpendicular to the direction of the magnetic field near the feed coil 3 from among the magnetic field generated near the opening 2A, and consequently, coupling does not occur between the feed coil 3 and the sheet conductor 2.

Note that the opening 2A illustrated in FIGS. 4 to 5C may be considered as a wide portion of the slit 2S, the wide portion being wider than the remainder of the slit 2S. With this structure, in the case in which a lens unit of a camera module is provided in the opening 2A or in the wide portion of the slit 2S, the sheet conductor 2 may be provided in an area that includes the camera module. The opening 2A may be used as a hole in which not only a lens unit of a camera module but also various functional units, such as a speaker or a microphone, for example, may be provided.

Third Preferred Embodiment

Figure 6A:
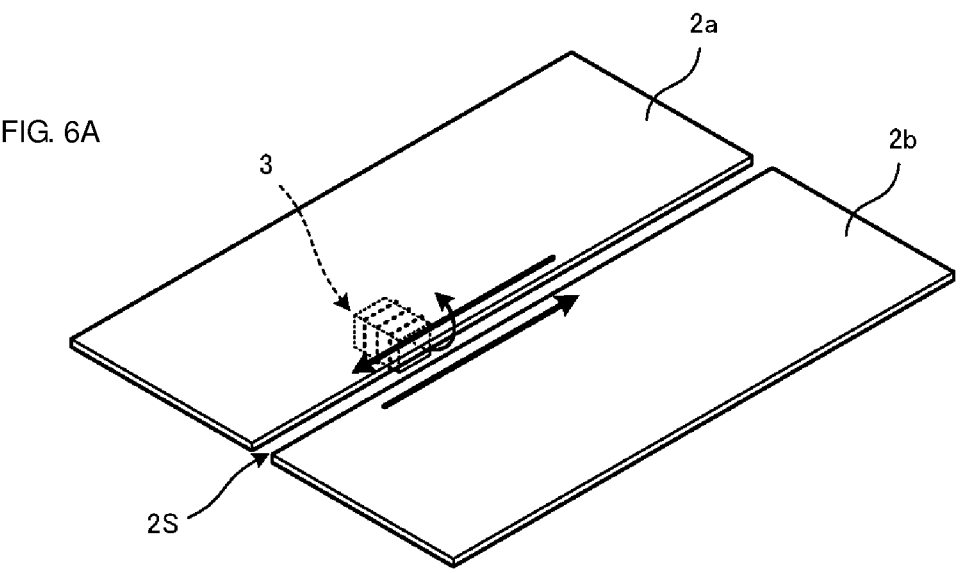
FIGS. 6A and 6B are perspective views of antenna devices according to a third preferred embodiment of the present invention.
Figure 6B:
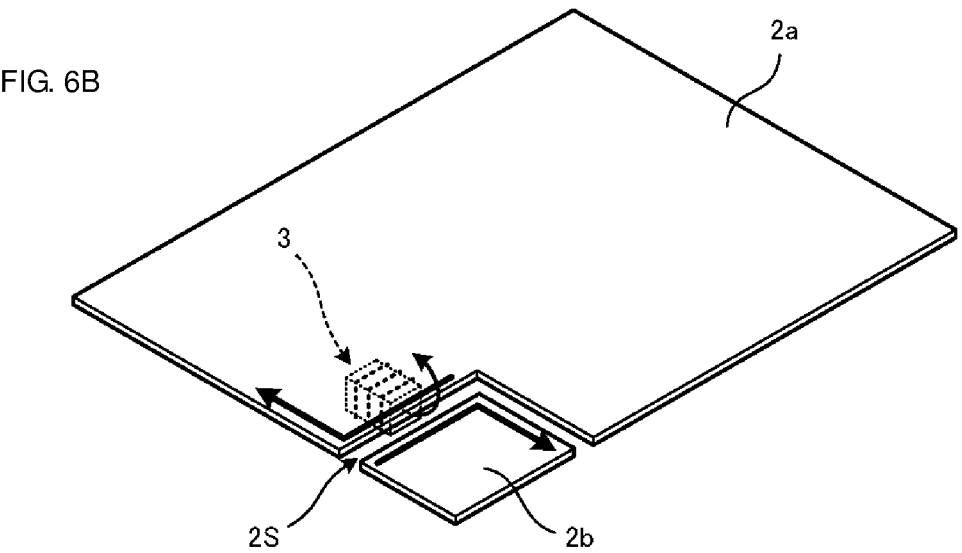

FIGS. 6A and 6B are perspective views of antenna devices according to a third preferred embodiment of the present invention. Both of FIGS. 6A and 6B illustrate examples in which two sheet conductors 2a and 2b are provided. In addition, the slit 2S is provided between the sheet conductors 2a and 2b. The total area of the sheet conductors 2a and 2b and slit 2S is preferably larger than the area of the feed coil 3. That is, when viewed in a direction perpendicular or substantially perpendicular to each of the sheet conductors 2a and 2b, the outer dimensions of the sheet conductors 2a and 2b are larger than those of the feed coil 3.

The feed coil 3 is preferably arranged such that the feed coil 3 is close to the side on which the sheet conductor 2a is provided and one of the coil openings of the feed coil 3 faces the slit 2S and the direction of the axis of the feed coil 3 is perpendicular or substantially perpendicular to the direction in which the slit 2S extends. Thus, similarly to the antenna device illustrated in the first preferred embodiment, coupling occurs between the feed coil 3 and the sheet conductor 2a. Coupling occurs between the sheet conductors 2b and 2a via the slit 2S. As a result, the sheet conductors 2a and 2b function as magnetic-field capturing elements (radiation plates) and magnetic-field coupling occurs between the feed coil 3 and the antenna coil 4, with which communication is performed, via the sheet conductors 2a and 2b. In the third preferred embodiment, a main surface of the sheet conductor 2a is preferably planar or substantially planar with a main surface of the sheet conductor 2b and the feed coil 3 is arranged such that the direction of the axis around which the coil-shaped conductor 31 is disposed is parallel or substantially parallel to the directions in which each of the sheet conductors 2a and 2b extends.

In the above-described examples, two sheet conductors are preferably provided, for example. However, three or more sheet conductors may be provided. Moreover, in the third preferred embodiment, the sheet conductors 2a and 2b are preferably electrically independent from each other. However, they may be connected to each other.

Fourth Preferred Embodiment

Figure 7:
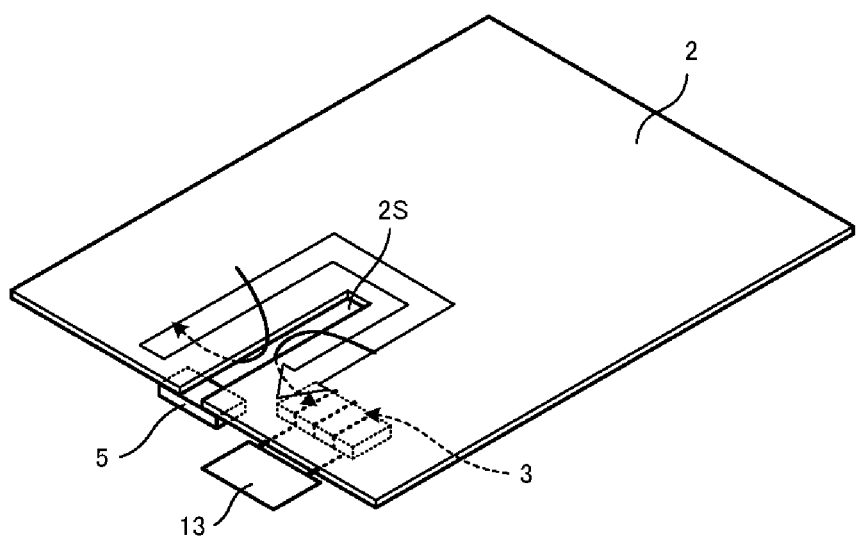
FIG. 7 is a perspective view of an antenna device according to a fourth preferred embodiment of the present invention.

FIG. 7 is a perspective view of an antenna device according to a fourth preferred embodiment of the present invention. Different from the antenna device illustrated in FIG. 1 in the first preferred embodiment, a capacitor 5 is connected to the sheet conductor 2 near an open end of the slit 2S so as to straddle the slit 2S. An example of the capacitor 5 is a chip capacitor.

Figure 8:
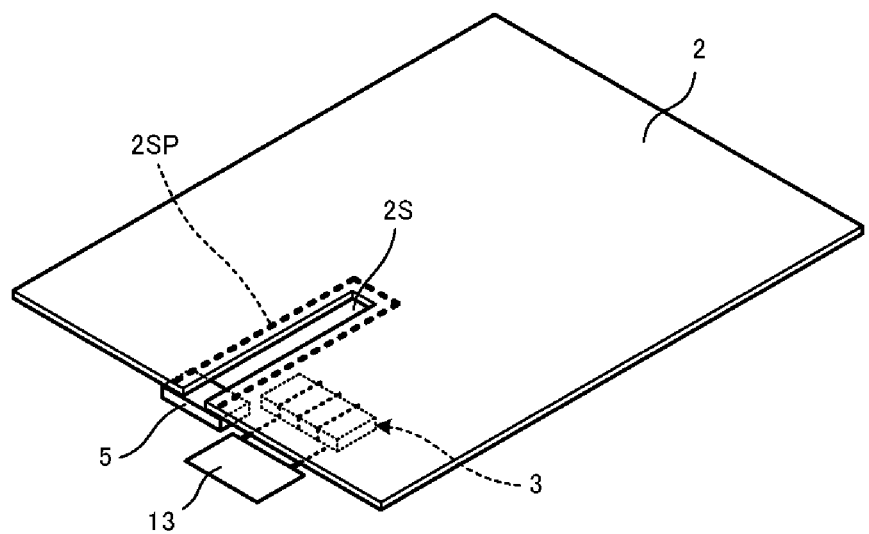
FIG. 8 is a diagram illustrating an inductor formation section of the sheet conductor of the antenna device according to the fourth preferred embodiment of the present invention.

FIG. 8 is a diagram illustrating an inductor formation section of the sheet conductor 2 of the antenna device according to the fourth preferred embodiment. In the case in which the capacitor 5 is connected to the sheet conductor 2 near the open end of the slit 2S so as to straddle the slit 2S, an inductor whose inductance primarily corresponds to an electrical length of an edge 2SP (a broken line in FIG. 8) of the slit 2S is provided. An LC circuit, which is a resonant circuit, is defined by the inductor and the capacitor 5. Note that the principle of operation differs between the examples illustrated in FIGS. 1 to 6B and the example illustrated in FIG. 7. In FIGS. 1 to 6B, an effect obtained by current flowing primarily along the edge of the sheet conductor 2 is used. In contrast, in FIG. 7, resonance occurring in the sheet conductor 2 is used. That is, in the case in which resonance is used, current flows in a loop in which the slit 2S is at the center or the approximate center. With either principle of operation described in the above-described examples, antenna characteristics may be improved by using such sheet conductors. Thus, the principle of operation described in the examples illustrated in FIGS. 1 to 6B or that described in the example illustrated in FIG. 7 may be used.

In contrast, a resonant circuit is defined by the coil-shaped conductor 31 of the feed coil 3 and the RFIC 13. The coil-shaped conductor 31 has inductance and self-capacitance. The RFIC 13 is an external device and connected to the feed coil 3. The RFIC 13 primarily has capacitance. The resonant frequency of the resonant circuit that is defined by the sheet conductor 2 and the capacitor 5 is fixed to a frequency near the resonant frequency of the resonant circuit that includes the feed coil 3. These resonant frequencies are fixed to a frequency near the carrier frequency. Consequently, strong electromagnetic-field coupling occurs between the feed coil 3 and the sheet conductor 2. As a result, electromagnetic field emissions may be highly efficiently provided from the sheet conductor 2.

The resonant frequency of the resonant circuit that includes the sheet conductor 2 may be determined in accordance with the capacitance of the capacitor 5 and the length of the slit 2S. Moreover, even when a component or a metal housing in which a magnetic substance, such as a microphone or a speaker, for example, is provided is approaching a region other than the slit 2S in the sheet conductor 2, the resonant frequency of the resonant circuit that includes the sheet conductor 2 does not significantly change. Thus, the antenna characteristics of such an antenna device are not affected by an environment in which the antenna device is installed, and consequently, stable antenna characteristics are obtained.

For example, in the case in which a carrier signal in the 13.56 MHz band is used to perform communication, the resonant frequency of the resonant circuit that includes the feed coil 3 (the resonant frequency of the resonant circuit that is defined by the feed coil 3 and the RFIC 13) is preferably set to about 13.56 MHz and the resonant frequency of the resonant circuit that includes the sheet conductor 2 is preferably set to about 13.8 MHz. By placing the resonant circuit that includes the feed coil 3 and the resonant circuit that includes the sheet conductor 2 close to each other, the resonant frequency of the resonant circuit that includes the feed coil 3 becomes about 13.1 MHz and the resonant frequency of the resonant circuit that includes the sheet conductor 2 becomes about 14.2 MHz, for example. That is, when coupling occurs between the two resonant circuits, two resonant frequencies occur in a coupling mode and gain will be obtained in the frequency bands of the resonant frequencies in the coupling mode. That is, the frequency band in which communication may be performed is widened by setting the resonant frequency of the resonant circuit that includes the sheet conductor 2 to be different from the resonant frequency of the resonant circuit that includes the feed coil 3.

Figure 9:
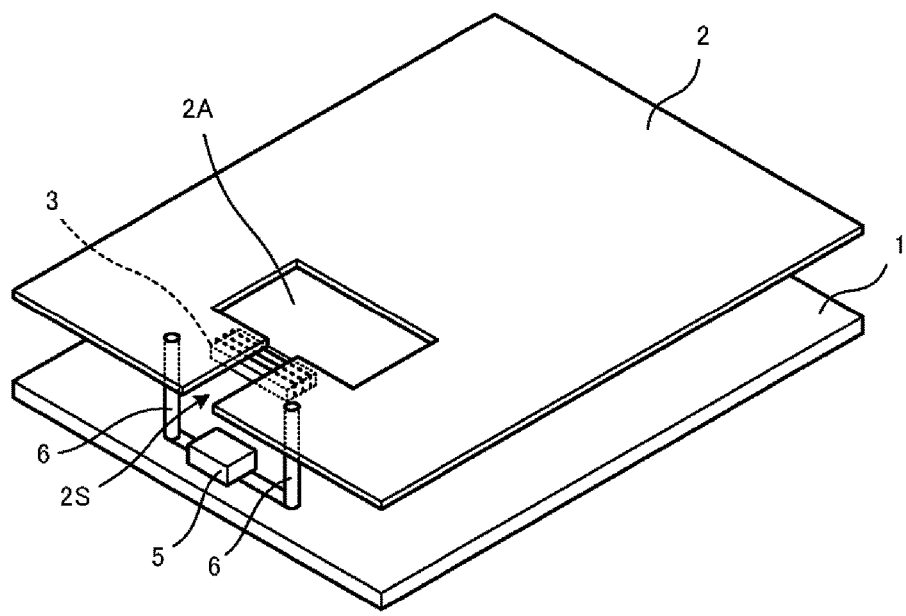
FIG. 9 is a perspective view of another antenna device according to the fourth preferred embodiment of the present invention.

FIG. 9 is a perspective view of another antenna device according to the fourth preferred embodiment. The structure of the sheet conductor 2 and that of the feed coil 3 are preferably the same or substantially the same as those illustrated in FIG. 4. In an example illustrated in FIG. 9, the capacitor 5 is mounted on a board 1 and the capacitor 5 is connected to the sheet conductor 2 via spring pins 6 so as to straddle the slit 2S. The inductance of an inductor that contributes to the resonance of the resonant circuit that includes the sheet conductor 2 is determined by the electrical length of current that flows along the edge of the slit 2S, the edge of the opening 2A, and the spring pins 6. With this structure, there is no need to provide a capacitor on the sheet conductor 2 and, thus, this structure has an advantage in that it is easy to manufacture such an antenna device. Note that, in FIG. 9, the feed coil 3 may be arranged on the sheet conductor 2 or may be arranged on the board 1 similarly to the capacitor 5. In the case in which the feed coil 3 and the capacitor 5 are mounted on the board 1, the feed coil 3 and the capacitor 5 may be integrated into a single device by using a multilayer board or other suitable structure.

Fifth Preferred Embodiment

Figure 10:
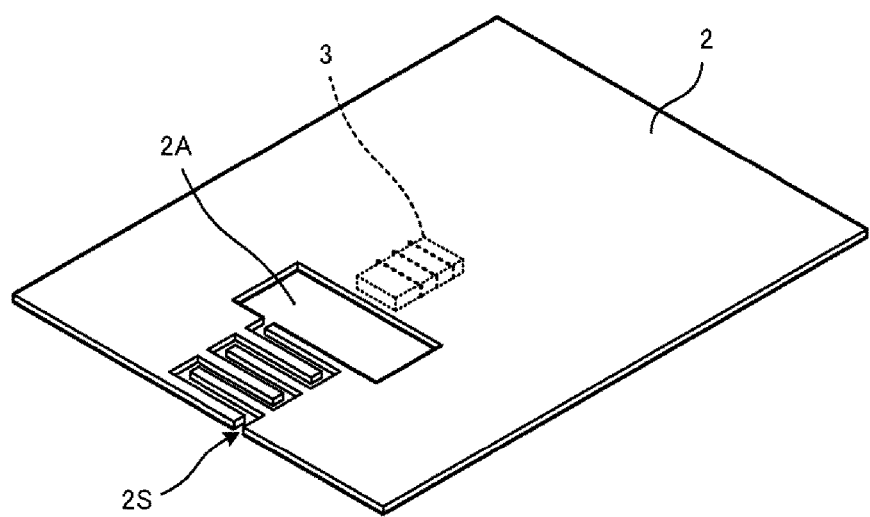
FIG. 10 is a perspective view of an antenna device according to a fifth preferred embodiment of the present invention.

FIG. 10 is a perspective view of an antenna device according to a fifth preferred embodiment of the present invention. The slit 2S and the opening 2A are provided in the sheet conductor 2. The slit 2S preferably has a substantial meandering-line shape. That is, the sheet conductor 2 is preferably cut to have a substantial comb-shape therein. Thus, a capacitor is provided at the slit 2S and the capacitance of the slit 2S increases. In contrast, an inductor is provided at the edge of the opening 2A. A resonant circuit is defined by the inductor provided at the edge of the opening 2A and the capacitor provided at the slit 2S. With this structure, a chip capacitor as an additional component is unnecessary. The slit 2S that has a substantial meandering-line shape may preferably be formed by a patterning method including etching, for example, and thus, a necessary capacitance may be obtained with high accuracy.

Note that the feed coil 3 is preferably arranged such that one of the coil openings of the feed coil 3 faces a portion of the edge of the opening 2A. Thus, strong magnetic-field coupling occurs between the feed coil 3 and the opening 2A.

Figure 11A:
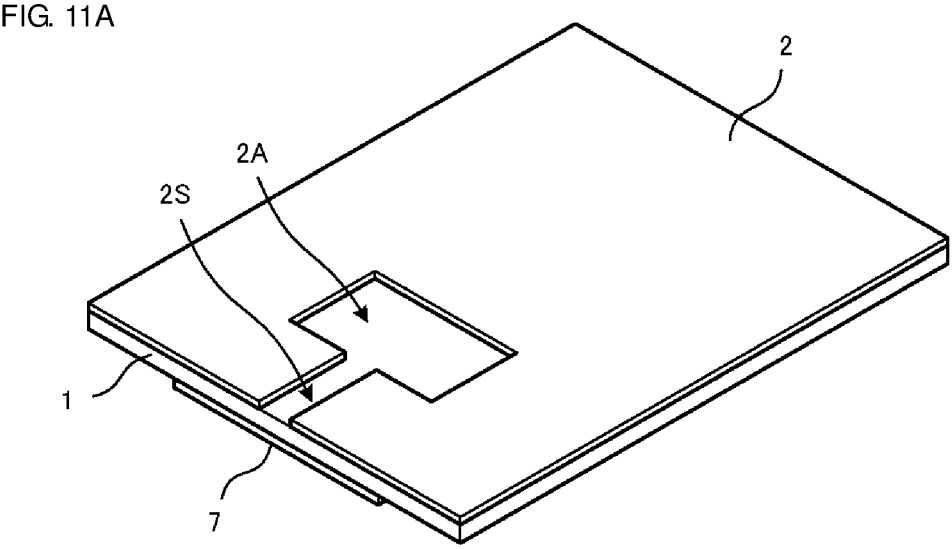
FIG. 11A is a perspective view of the sheet conductor included in another antenna device according to the fifth preferred embodiment of the present invention.
Figure 11B:
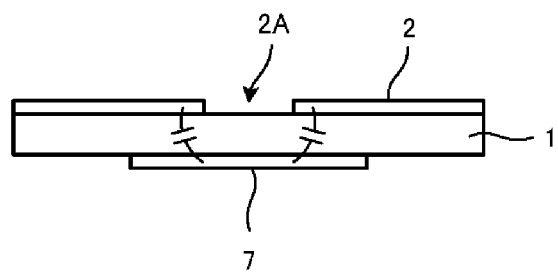
FIG. 11B is a front view of the other antenna device.

FIG. 11A is a perspective view of the sheet conductor 2 included in another antenna device according to the fifth preferred embodiment and FIG. 11B is a front view of the other antenna device. In this example, the sheet conductor 2 is provided on the top surface of the board 1, which has a flexible sheet-shaped structure, and a capacitor formation electrode 7 is provided on the bottom surface of the board 1. The capacitor formation electrode 7 is preferably arranged at a position that faces the conductor portions on both sides of the slit 2S of the sheet conductor 2. With this structure, a chip capacitor as an additional component is unnecessary.

Sixth Preferred Embodiment

Figure 12A:
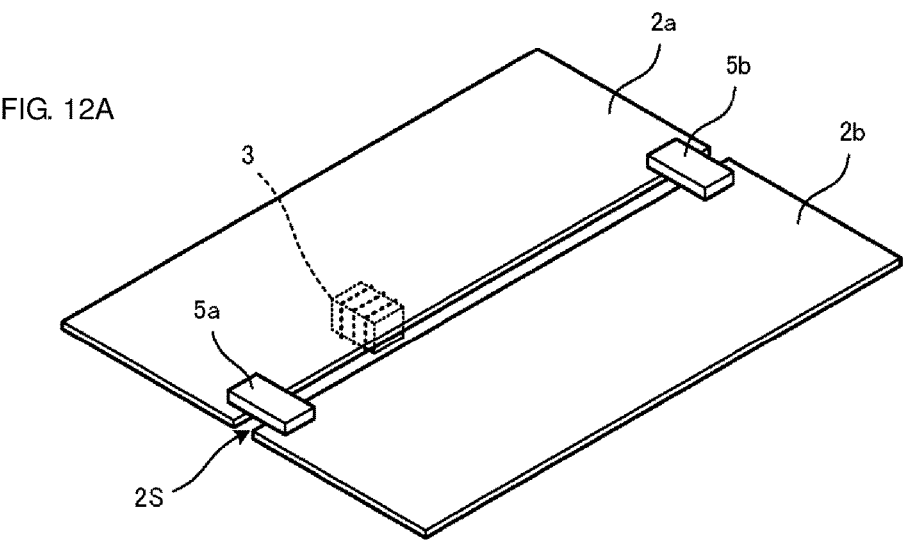
FIGS. 12A and 12B are perspective views of antenna devices according to a sixth preferred embodiment of the present invention.
Figure 12B:
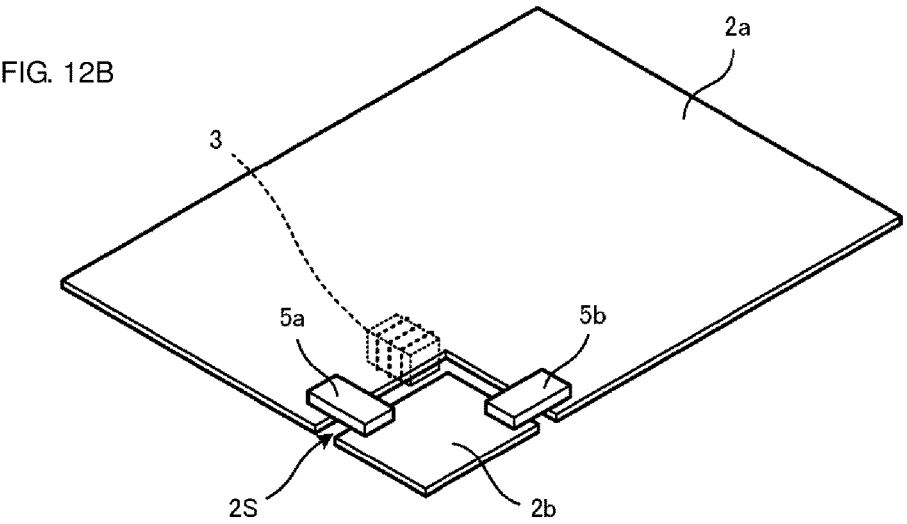

FIGS. 12A and 12B are perspective views of antenna devices according to a sixth preferred embodiment of the present invention. In both examples illustrated in FIGS. 12A and 12B, the two sheet conductors 2a and 2b are included. The slit 2S is provided between the sheet conductors 2a and 2b. A capacitor 5a is connected to the sheet conductors 2a and 2b at near one of the ends of the slit 2S and a capacitor 5b is connected to the sheet conductors 2a and 2b at near the other end of the slit 2S. The inductance of an inductor that contributes to determination of a resonant frequency of a resonant circuit that includes the sheet conductors 2a and 2b is determined by the length of the edge of the slit 2S. A resonant circuit is defined by the inductor and the two capacitors 5a and 5b. The remainder of the antenna device is preferably the same or substantially the same as that described in the third preferred embodiment with reference to FIG. 6.

As described above, even with the structure in which a slit is provided between a plurality of sheet conductors, the resonant frequency of a resonant circuit that includes sheet conductors may be determined.

Note that when the sheet conductors 2a and 2b are at the same potential in a DC manner, the sheet conductors 2a and 2b may be used as shield conductors.

Seventh Preferred Embodiment

Figure 13:
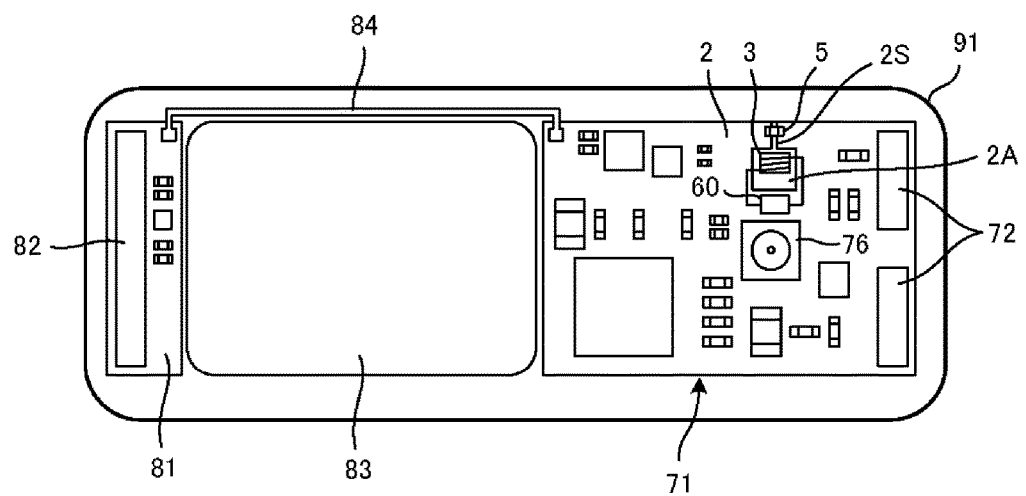
FIG. 13 is a plan view illustrating an internal structure of a wireless communication device that includes an antenna device according to a seventh preferred embodiment of the present invention.

FIG. 13 is a plan view illustrating an internal structure of a wireless communication device that includes an antenna device according to a seventh preferred embodiment. This wireless communication device preferably is a communication terminal device, a typical example of which is a smartphone. Circuit boards 71 and 81, a battery pack 83, and other components are included in a housing 91. An RFIC 60, which includes a communication circuit, the feed coil 3, the capacitor 5, and other components are mounted on the circuit board 71. An UHF-band antenna 72, a camera module 76, and other components are also mounted on the circuit board 71. Moreover, an UHF-band antenna 82 and other components are mounted on the circuit board 81. The circuit boards 71 and 81 are connected to each other via a coaxial cable 84.

A ground conductor provided on the circuit board 71 functions as a sheet conductor. The slit 2S and the opening 2A are provided in the ground conductor. The capacitor 5 is mounted at an end, which is positioned near the edge of the sheet conductor 2, of the slit 2S so as to straddle the slit 2S. Moreover, the feed coil 3 is mounted in the opening 2A. The feed coil 3 is arranged such that the feed coil 3 is close to a portion of the edge of the opening 2A and one of the coil openings of the feed coil 3 faces the portion of the edge of the opening 2A. Thus, strong coupling occurs for the feed coil 3 through a magnetic field generated for the opening 2A.

In an example illustrated in FIG. 13, there is no need to provide a dedicated component as a sheet conductor and the number of required components is reduced. Moreover, communication may be performed with both sides of the housing of the wireless communication device. Moreover, when the capacitance of the capacitor 5 is set to be a large value with which the capacitor 5 functions as a bypass capacitor in the UHF band, a high-frequency current from an UHF-band antenna does not flow near the feed coil 3. Thus, the characteristics of an UHF-band antenna are not deteriorated under the influence of (the material of) the feed coil 3.

Figure 14:
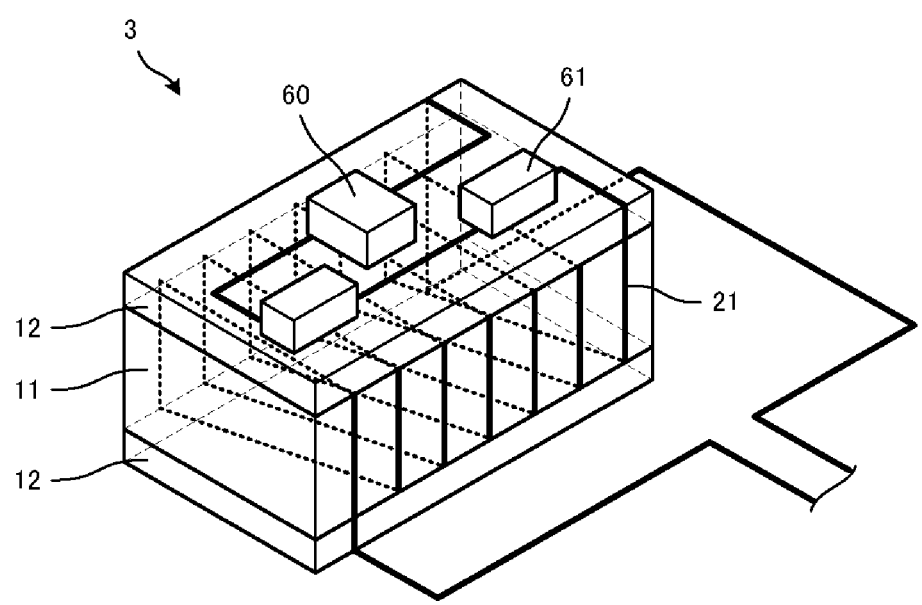
FIG. 14 is a perspective view of the feed coil, which is modularized, according to the seventh preferred embodiment of the present invention.

FIG. 14 is a perspective view of the feed coil 3, which is modularized, according to the seventh preferred embodiment. The feed coil 3 uses, as an element assembly, a multilayer body formed by stacking a ceramic layer and resin layers. The multilayer body is preferably made of a magnetic layer 11 and non-magnetic (dielectric) layers 12, the non-magnetic layers 12 sandwiching the magnetic layer 11. A first coil-shaped conductor is provided around the magnetic layer 11. A second coil-shaped conductor is provided inside the magnetic layer 11. The RFIC 60 and a chip component 61, such as a chip inductor or a chip capacitor, for example, are mounted on the top surface of the multilayer body. A capacitor used to set the resonant frequency is defined by an electrode pattern on a dielectric layer 12. In this manner, components included in a feeder circuit may be modularized.

Eighth Preferred Embodiment

Figure 15:
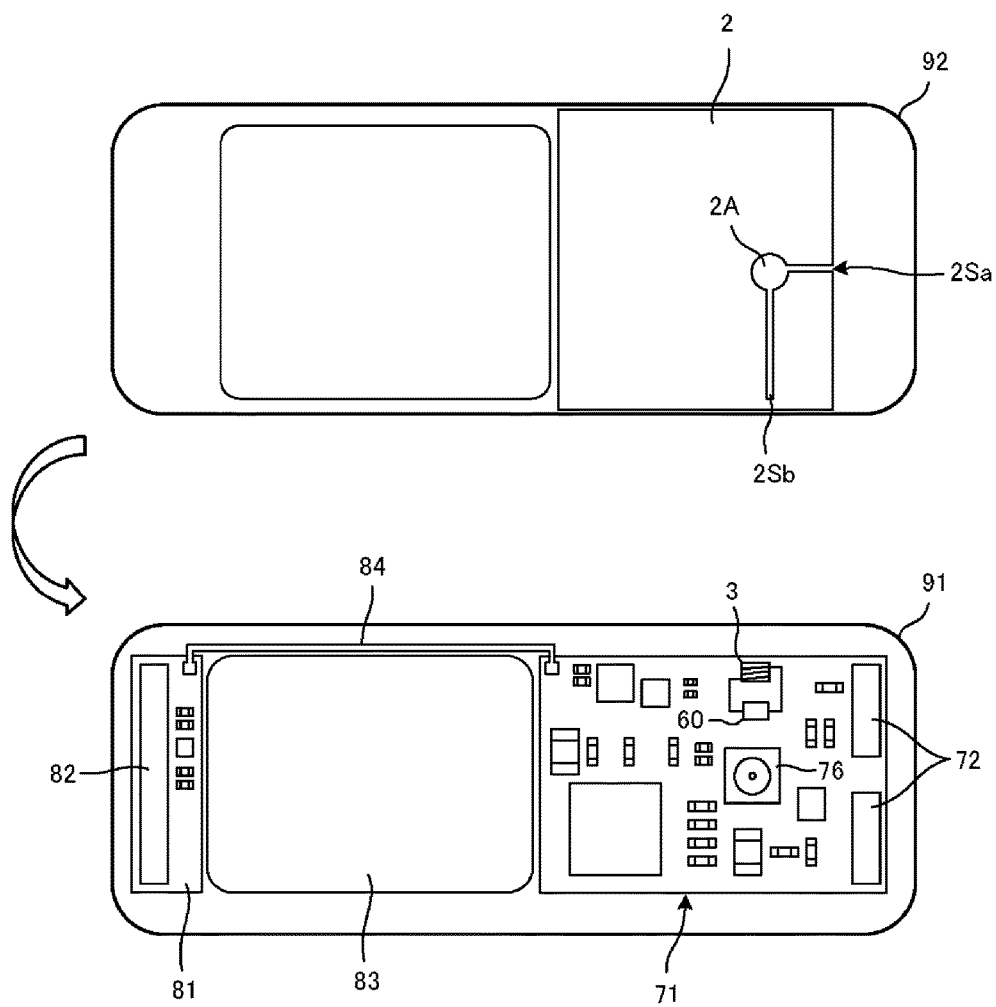
FIG. 15 includes a diagrams illustrating an internal structure of a wireless communication device that includes an antenna device according to an eighth preferred embodiment of the present invention, the diagrams being plan views that separately show a state of the inside of an upper housing and a state of the inside of a lower housing.

FIG. 15 includes diagrams illustrating an internal structure of a wireless communication device that includes an antenna device according to an eighth preferred embodiment of the present invention. FIG. 15 includes plan views that separately show a state of the inside of an upper housing 91 and a state of the inside of a lower housing 92. In this example, the lower housing 92 is preferably made of resin and the sheet conductor 2, which is preferably a metal film, is provided in the lower housing 92. The sheet conductor 2 may be provided such that a sheet conductor is attached to a flexible board or may be drawn on the inner-side surface of the lower housing 92 by laser direct structuring (LDS). Slit sections 2Sa and 2Sb and the opening 2A are provided in the sheet conductor 2. A section of the housing corresponding to the opening 2A also includes an opening. The camera module 76 is preferably arranged such that a lens of the camera module 76 is optically exposed from the opening of the housing.

FIG. 15 illustrates an example in which the feed coil 3 is preferably arranged such that one of the coil openings of the feed coil 3 faces the closed end (an end that is far from the opening 2A) of the slit section 2Sb and the direction of the axis of the feed coil 3 is perpendicular or substantially perpendicular to the width direction of the closed end of the slit portion 2Sb. With this structure, coupling occurs for the feed coil 3 through a magnetic field generated by the current that flows along the closed end of the slit section 2Sb. That is, coupling occurs between the feed coil 3 and the sheet conductor 2. The remainder of the structure in the upper housing 91 is preferably the same or substantially the same as that illustrated in FIG. 13.

Ninth Preferred Embodiment

Figure 16A:
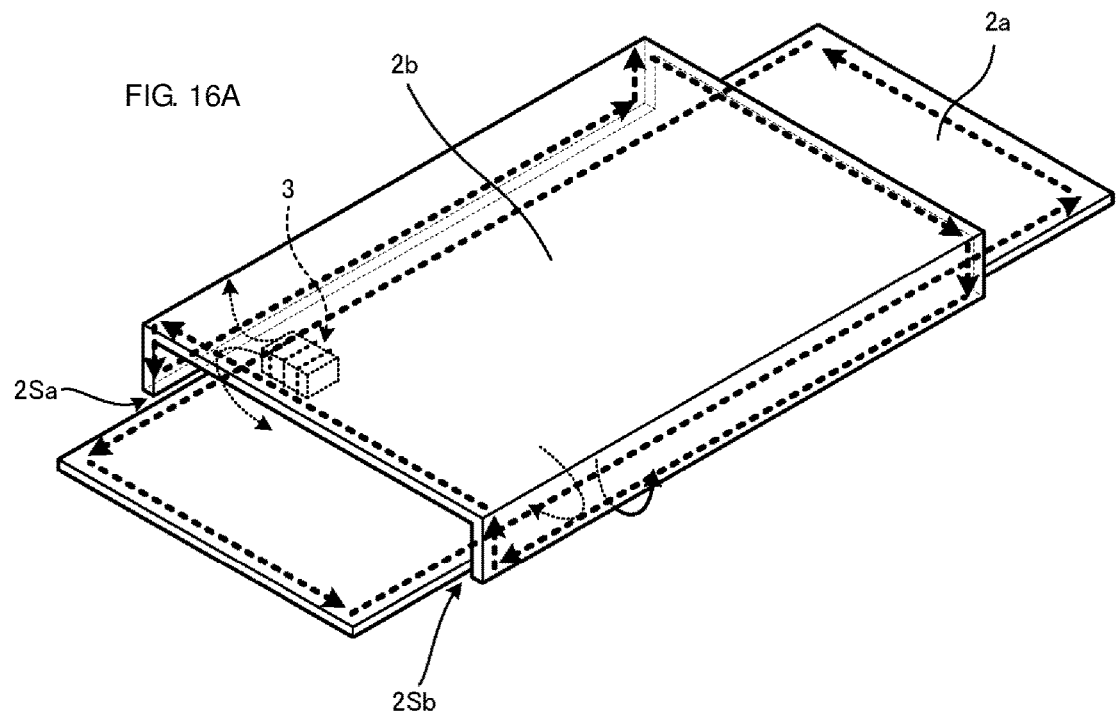
FIG. 16A is a perspective view of an antenna device according to a ninth preferred embodiment of the present invention.
Figure 16B:
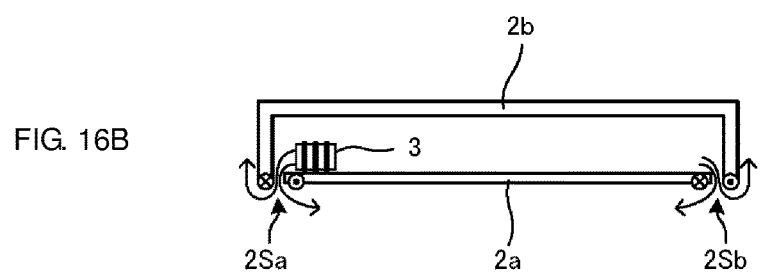
FIG. 16B is a front view of the antenna device.

FIG. 16A is a perspective view of an antenna device according to a ninth preferred embodiment of the present invention and FIG. 16B is a front view of the antenna device. In this example, the antenna device includes the two sheet conductors 2a and 2b. The sheet conductor 2a is, for example, a ground conductor provided on a circuit board. The sheet conductor 2b is a metal housing portion that is a portion of the housing of a communication terminal. The sheet conductor 2b includes two wall portions, which are preferably substantially sheet-shaped, and a main surface portion provided between the wall portions. The sheet conductor 2a is a ground conductor and is provided on a front layer or an inner layer of the circuit board. The feed coil 3 is mounted as a chip-type component on the front layer of the circuit board. The circuit board is a printed wiring board. Although not illustrated, various components, such as a cellular RF circuit and a driving circuit for a display device, for example, may preferably mounted on the circuit board.

The slits 2Sa and 2Sb are provided between the sheet conductors 2a and 2b. That is, a side of the sheet conductor 2a and a side of the sheet conductor 2b face each other via the slit 2Sa, and another side of the sheet conductor 2a and another side of the sheet conductor 2b face each other via the slit 2Sb. More specifically, the slit 2Sa is provided between one of the wall portions of the sheet conductor 2b and the sheet conductor 2a, and the slit 2Sb is provided between the other one of the wall portions of the sheet conductor 2b and the sheet conductor 2a. The sheet conductor 2a and each of the wall portions of the sheet conductor 2b are preferably arranged such that a direction perpendicular or substantially perpendicular to the sheet conductor 2a is perpendicular or substantially perpendicular to a direction perpendicular or substantially perpendicular to the wall portion.

The metal housing portion is preferably made of conductive material, for examples, magnesium, aluminum, and/or carbon fiber. The sheet conductor 2a is also preferably made of conductive material. Other than the ground conductor of the printed wiring board, various metallic bodies, such as a metal chassis, a shield case, or a metal cover of a battery pack arranged in the communication terminal may preferably be used as the sheet conductor 2a.

The feed coil 3 is arranged at a position closer to the sheet conductor 2a than to the sheet conductor 2b. That is, the feed coil 3 is preferably arranged so as to be close to the sheet conductor 2a such that the direction of the axis of the feed coil is parallel or substantially parallel to the directions in which the sheet conductor 2a extends. In this manner, in the case in which spaces defined by a plurality of sheet conductors that are adjacent to each other are used as slits, it a feed coil is preferably arranged such that the direction of the axis of the feed coil differs from a direction perpendicular or substantially perpendicular to one of the plurality of sheet conductors, the sheet conductor being closest to the feed coil.

In FIG. 16A, arrows drawn with a broken line represent the flow of current that flows along the edge of the sheet conductor 2a and the flow of current that flows along the edge of the sheet conductor 2b. Moreover, in FIG. 16B, arrows represent magnetic flux that passes through the slits 2Sa and 2Sb. For example, by placing the sheet conductor 2b close to an antenna coil with which communication is performed, an induced current is generated in the sheet conductor 2b and the induced current flows primarily along the edge of the sheet conductor 2b due to the cut-edge effect. Then, a current is induced in the sheet conductor 2a that is adjacent to the sheet conductor 2b via the slits 2Sa and 2Sb. This current flows primarily along the edge of the sheet conductor 2a due to the cut-edge effect. Furthermore, coupling between the feed coil 3 and the sheet conductors 2a and 2b occurs through a magnetic field that passes the slit 2Sa.

Note that when the sheet conductors 2a and 2b are at the same potential in a DC manner, the sheet conductors 2a and 2b may preferably be used as shield conductors. That is, the sheet conductors 2a and 2b may be electrically independent from each other or may be connected to each other via a power-supply pin, for example.

In this manner, two sheet conductors are not in one plane and are in different planes, and the slits 2Sa and 2Sb may be provided between the sheet conductors, which are in different planes. Similar effects and advantages may be obtained. In particular, according to the ninth preferred embodiment, there is no need to provide, in the metal housing portion, a slit or an opening used for coupling that occurs for the feed coil 3. Thus, the strength of the metal housing portion is not greatly reduced and a degree of flexibility in the design of the housing is improved.

Figure 17:
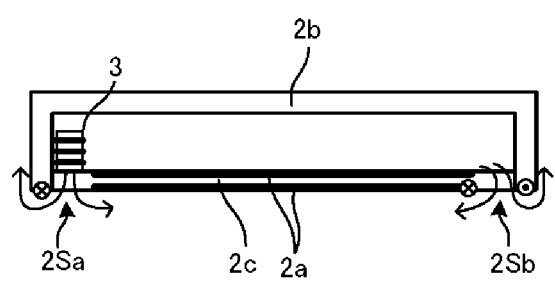
FIG. 17 is a front view of an antenna device that illustrates another example of a state in which the feed coil is arranged.

Note that a state in which the feed coil 3 is arranged is not limited to those illustrated in FIGS. 16A and 16B. FIG. 17 is a front view of an antenna device that illustrates another exemplary state in which the feed coil 3 is arranged. As illustrated in FIG. 17, sheet conductors 2a are ground conductors and are provided on front layers (or on an inner layer) of an insulating board 2c. The feed coil 3 is mounted on an area of the insulating board 2c, the area being an area in which a sheet conductor 2a is not provided. The feed coil 3 may preferably be arranged such that the direction of the axis of the feed coil 3 is perpendicular or substantially perpendicular to the directions in which the insulating board 2c extends and a portion of one of the coil openings of the feed coil 3 is at a position that overlaps the slit 2Sa. Even in this case, coupling between the feed coil 3 and the sheet conductors 2a and 2b occurs through a magnetic field that passes the slit 2Sa.

Tenth Preferred Embodiment

Figure 18A:
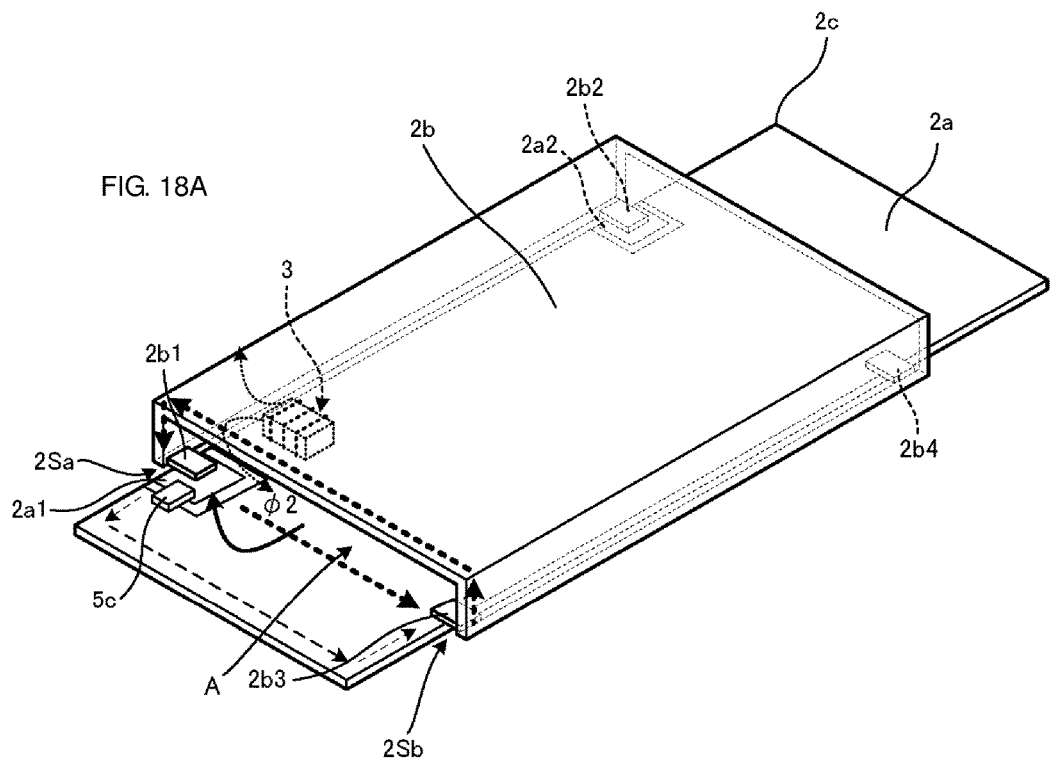
FIG. 18A is a perspective view of an antenna device according to a tenth preferred embodiment of the present invention.
Figure 18B:
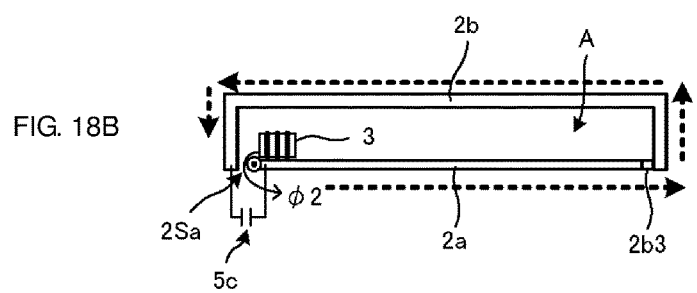
FIG. 18B is a front view of the antenna device.
Figure 19:
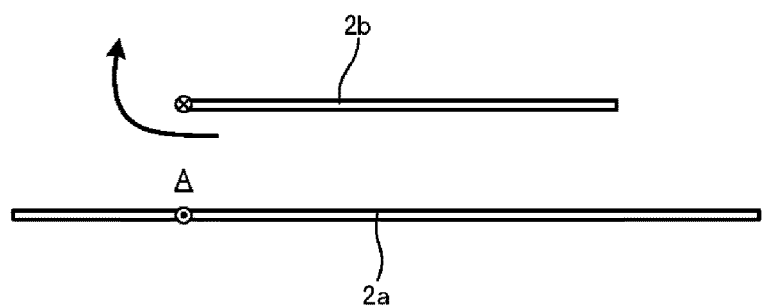
FIG. 19 is a side view of the antenna device.

FIG. 18A is a perspective view of an antenna device according to a tenth preferred embodiment of the present invention and FIG. 18B is a front view of the antenna device. FIG. 19 is a side view of the antenna device. In this example, similarly to the ninth preferred embodiment, two sheet conductors 2a and 2b are included. This example differs from the ninth preferred embodiment in that connection units 2b1, 2b2, 2b3, and 2b4 are provided so as to straddle the slits 2Sa and 2Sb and the slits 2Sa and 2Sb are partially connected to each other.

The sheet conductor 2a and electrode patterns 2a1 and 2a2 are provided on a circuit board 2c. The electrode patterns 2a1 and 2a2 are not electrically connected to the sheet conductor 2a. Similarly to the ninth preferred embodiment, the sheet conductor 2a is, for example, a ground conductor provided on the circuit board 2c and the sheet conductor 2b is a portion of the metal housing. The slits 2Sa and 2Sb are provided between the circuit board 2c and the sheet conductor 2b. Note that, other than the ground conductor, various metallic bodies, such as a metal chassis, a shield case, or a metal cover of a battery pack, may preferably be used as the sheet conductor 2a.

The sheet conductor 2b is connected to the circuit board 2c by the connection units 2b1 and 2b2 such that the sheet conductor 2b is electrically connected to the electrode patterns 2a1 and 2a2 at both ends of the slit 2Sa in the longitudinal direction. As described above, the electrode patterns 2a1 and 2a2 are not electrically connected to the sheet conductor 2a. Thus, the sheet conductor 2b is not electrically connected to the sheet conductor 2a on the side at which the slit 2Sa is provided.

Moreover, the sheet conductor 2b is connected to the circuit board 2c by the connection units 2b3 and 2b4 such that the sheet conductor 2b is electrically connected to the sheet conductor 2a at both ends of the slit 2Sb in the longitudinal direction. Note that the sheet conductor 2b may be connected to the circuit board 2c such that the slit 2Sb is not provided.

Note that the connection units 2b1, 2b2, 2b3, and 2b4 may preferably be metal screws, solder, or conductive paste, for example. Moreover, the sheet conductor 2b may have a structure in which the sheet conductor 2b is fitted into the sheet conductor 2a.

Similarly to the ninth preferred embodiment, the feed coil 3 is mounted on the circuit board 2c on the side at which the slit 2Sa is provided.

A capacitor 5c is provided on the circuit board 2c. The capacitor 5c connects the electrode pattern 2a1 with the sheet conductor 2a. The sheet conductors 2a and 2b are electrically connected with each other by the connection units 2b1 and 2b3 and the capacitor 5c. As illustrated in FIG. 18B, an opening A provided by the sheet conductors 2a and 2b functions as an inductor. An LC circuit is defined by the inductor and the capacitor 5c. The capacitance of the capacitor 5c is set to a capacitance at which resonance occurs for the LC circuit in the carrier-frequency band for a communication signal or near the carrier-frequency band.

In FIGS. 18A and 18B, magnetic flux $\phi2$ represents magnetic flux that passes through the feed coil 3 and the slit 2Sa. In this manner, a current is induced in the sheet conductor 2a by magnetic flux passing through the slit 2Sa. As a result, current flows in the sheet conductors 2a and 2b along the opening A. That is, a loop is provided around the opening A and current flows in the loop with its center at the opening A. Consequently, magnetic flux enters and leaves the opening A and the opening A functions as a radiation unit in the antenna device as indicated by an arrow in FIG. 19.

Note that, as indicated by arrows drawn with a broken line, an eddy current flows in a portion of the sheet conductor 2a, the portion being located outside the opening A, so as to cancel magnetic flux emitted from the opening A. Thus, a magnetic field emitted from the opening A tends to be emitted such that the magnetic field is bent toward the side at which the sheet conductor 2b is provided.

In the tenth preferred embodiment, a structure in which the length of the sheet conductor 2b in the longitudinal direction is shorter than that of the sheet conductor 2a is preferable. With this structure, magnetic flux is emitted from the opening A toward the side at which the sheet conductor 2b is provided. Communication may be more efficiently performed by orienting the sheet conductor 2b toward an antenna with which communication is performed. Moreover, the capacitor 5c may be a variable capacitor and the resonant frequency may be variable.

Eleventh Preferred Embodiment

Figure 20:
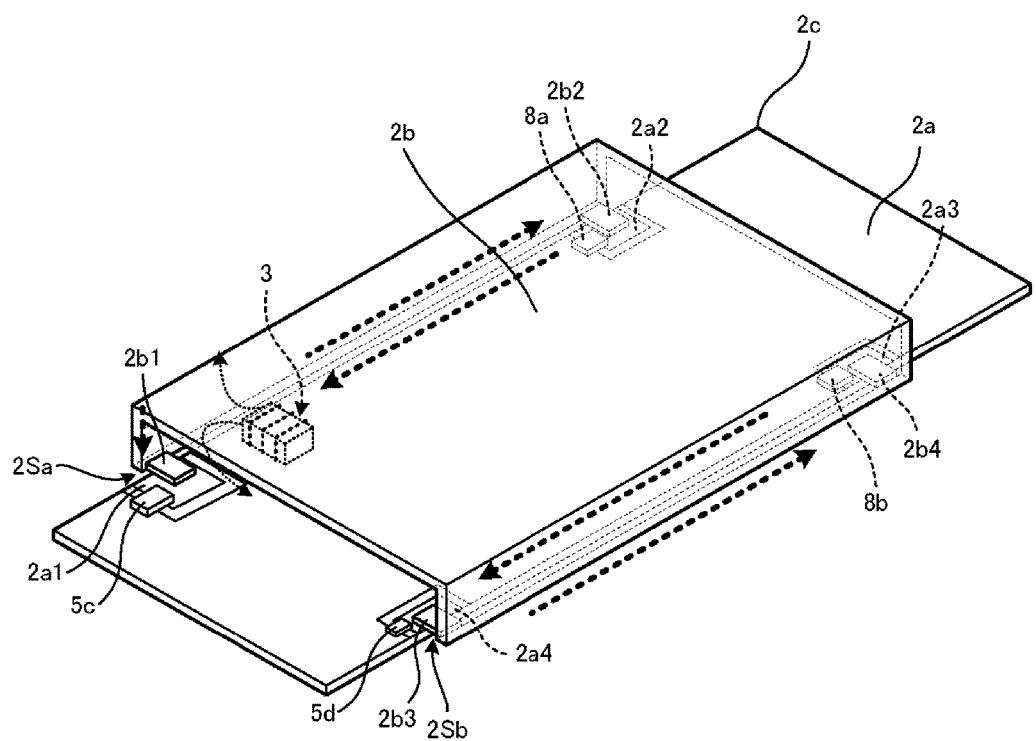
FIG. 20 is a perspective view of an antenna device according to an eleventh preferred embodiment of the present invention.

FIG. 20 is a perspective view of an antenna device according to an eleventh preferred embodiment of the present invention. In this example, electrode patterns 2a3 and 2a4, which are not electrically connected to the sheet conductor 2a, are further provided on the circuit board 2c. The electrode patterns 2a2 and 2a3 are electrically connected to the sheet conductor 2a by inductors 8a and 8b, respectively. Moreover, the electrode pattern 2a4 is electrically connected to the sheet conductor 2a by a capacitor 5d.

With this structure, an inductor is provided at the edge of the slit 2Sa. An LC circuit is defined by the inductor and the capacitor 5c. By using the inductor 8a, the inductance of the LC circuit is easily set to an inductance with which resonance occurs for the LC circuit in the carrier-frequency band for a communication signal or near the carrier-frequency band, in contrast to a case in which only the inductor provided at the edge of the slit 2Sa is used. Similarly, a current is induced by magnetic flux that passes through the slit 2Sb, even at the edge of the slit 2Sb in the direction indicated by arrows. That is, magnetic flux is emitted even from the slit 2Sb.

Twelfth Preferred Embodiment

Figure 21:
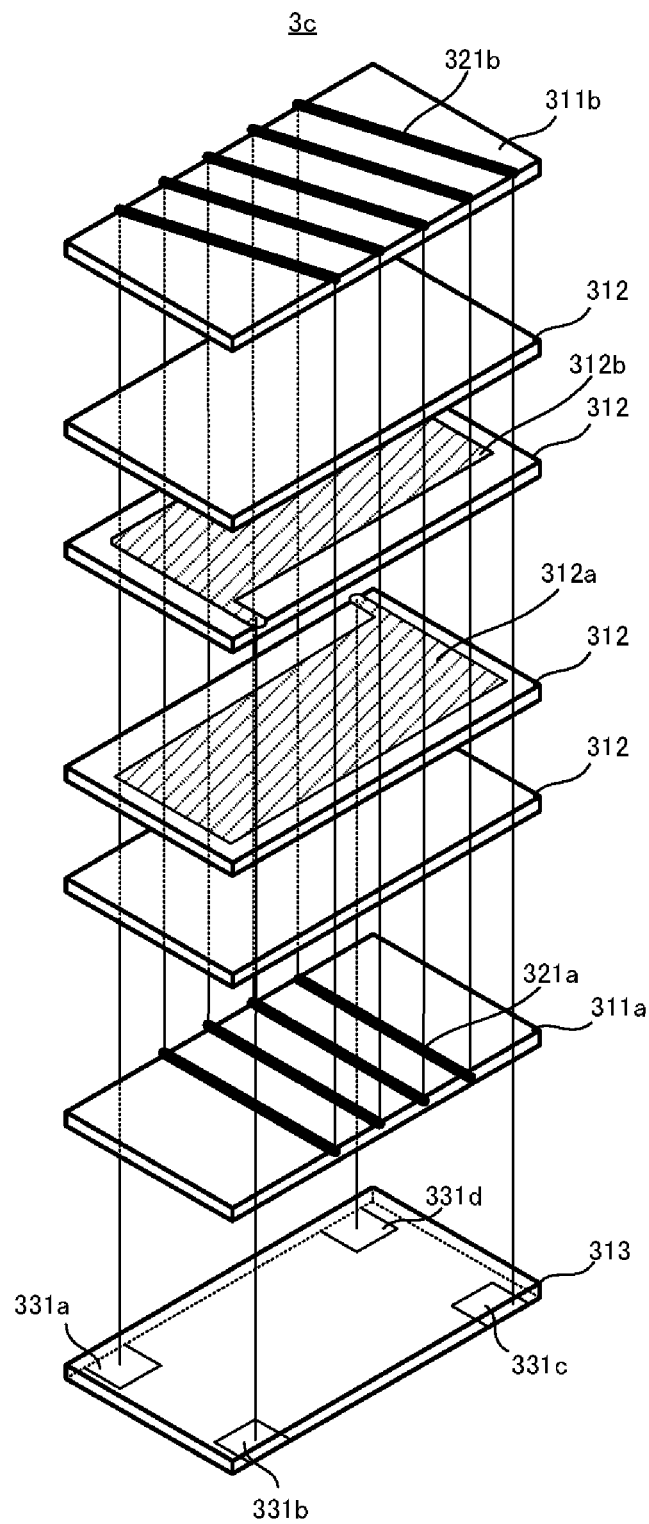
FIG. 21 is an exploded perspective view of a feed coil used in an antenna device according to a twelfth preferred embodiment of the present invention.

FIG. 21 is an exploded perspective view of a feed coil used in an antenna device according to a twelfth preferred embodiment of the present invention. A feed coil 3c according to the twelfth preferred embodiment includes an inductance value and a capacitance value. Specifically, as illustrated in FIG. 21, the feed coil 3c includes a non-magnetic layer 311a, a magnetic layer 311b, and a plurality of magnetic layers 312. The feed coil 3c has a structure in which the plurality of magnetic layers 312 are sandwiched by the non-magnetic layer 311a and the magnetic layer 311b. An in-plane conductor 321a is provided on the non-magnetic layer 311a and an in-plane conductor 321b is provided on the magnetic layer 311b. The in-plane conductors 321a and 321b are a portion of a coil pattern. Although not illustrated, side-surface vias are provided on the side surfaces of the magnetic layers 312. The side-surface vias are used to connect the in-plane conductor 321a of the non-magnetic layer 311a with the in-plane conductor 321b of the magnetic layer 311b.

Moreover, plane conductor patterns 312a and 312b are provided on two magnetic layers 312 positioned near the axis of the feed coil 3c from among the plurality of magnetic layers 312. The plane conductor patterns 312a and 312b face each other in the stacking direction and define a capacitor. The magnetic field generated from the coil pattern is strongest near the in-plane conductors 321a and 321b and becomes weaker towards the axis of the feed coil 3c. Thus, when a capacitor is provided near the axis of the feed coil 3c, the capacitor does not greatly affect the antenna characteristics.

The non-magnetic layer 311a is stacked on a non-magnetic layer 313 on which input-output terminals 331a, 331b, 331c, and 331d are provided. Note that the input-output terminals 331a, 331b, 331c, and 331d may be provided on a surface of the non-magnetic layer 311a opposite the surface on which the in-plane conductor 321a is provided. Alternatively, the in-plane conductor 321a may be provided on the bottom surface of the non-magnetic layer 311a and the non-magnetic layer 311a may be a magnetic layer.

The input-output terminal 331a is connected to an end of the coil pattern and the input-output terminal 331c is connected to the other end of the coil pattern. That is, the input-output terminals 331a and 331c are input-output terminals of the coil of the feed coil 3c. Moreover, the plane conductor pattern 312b is connected to the input-output terminal 331b, and the plane conductor pattern 312a is connected to the input-output terminal 331d. That is, the input-output terminals 331b and 331d are preferably input-output terminals of the capacitor.

Figure 22:
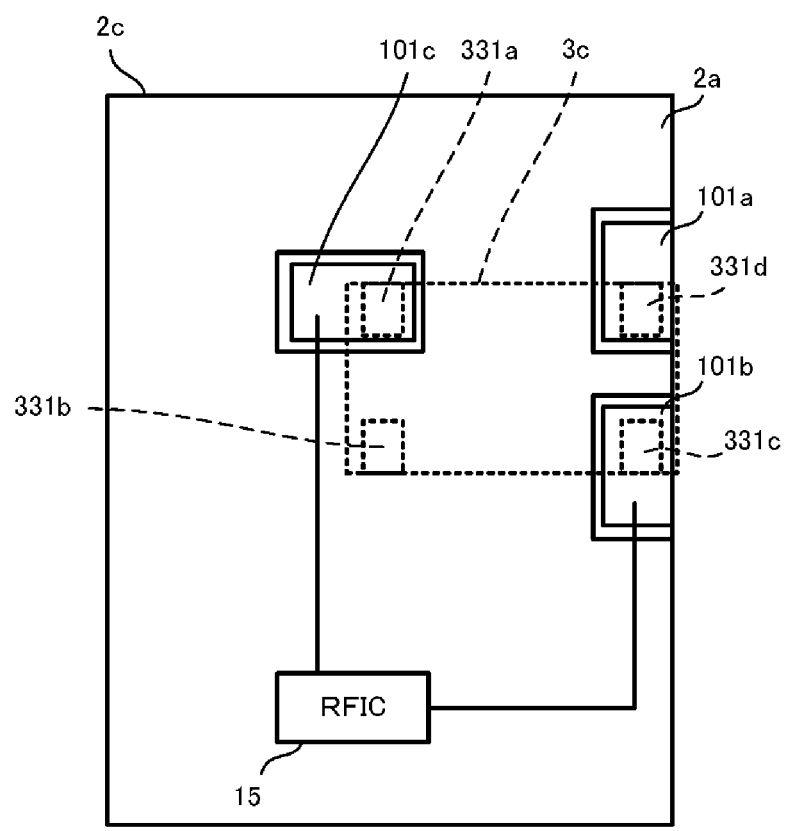
FIG. 22 is a diagram illustrating a part of a board on which a feed coil according to the twelfth preferred embodiment is mounted of the present invention.

FIG. 22 is a diagram illustrating a portion of a board on which a feed coil according to the twelfth preferred embodiment is mounted. The circuit board 2c and the sheet conductor 2a provided on the circuit board 2c illustrated in FIG. 22 are preferably the same as or similar to those in the tenth and eleventh preferred embodiments. In FIG. 22, electrode patterns used for terminals (hereinafter referred to as "terminal-use electrode patterns") are denoted by 101a, 101b, and 101c. The terminal-use electrode patterns 101a, 101b, and 101c are not electrically connected to the sheet conductor 2a. The feed coil 3c is preferably arranged such that the input-output terminals 331a, 331b, 331c, and 331d are electrically connected to the terminal-use electrode pattern 101c, the sheet conductor 2a, the terminal-use electrode pattern 101b, and the terminal-use electrode pattern 101a, respectively. An RFIC 15 is connected to the terminal-use electrode patterns 101b and 101c. The sheet conductor 2b, which has already been described in the tenth and eleventh preferred embodiments, is connected to the terminal-use electrode pattern 101b by the connection unit 2b1 (see FIG. 18A).

With this structure, the feed coil 3c includes an inductance value and a capacitance value. Thus, the capacitor 5c is not necessary as an additional component, which has already been described in the tenth and eleventh preferred embodiments. As a result, a capacitor may be built into without enlarging the size of an antenna, and consequently, space savings on the circuit board is achieved.

Note that a capacitor provided in the feed coil 3c may be arranged in the stacking direction, or in a direction perpendicular or substantially perpendicular to the stacking direction, that is, in a direction along the surface of each layer. Moreover, the feed coil 3c may include a plurality of capacitors.

A modified example of the feed coil according to the twelfth preferred embodiment will be described below.

Figure 23:
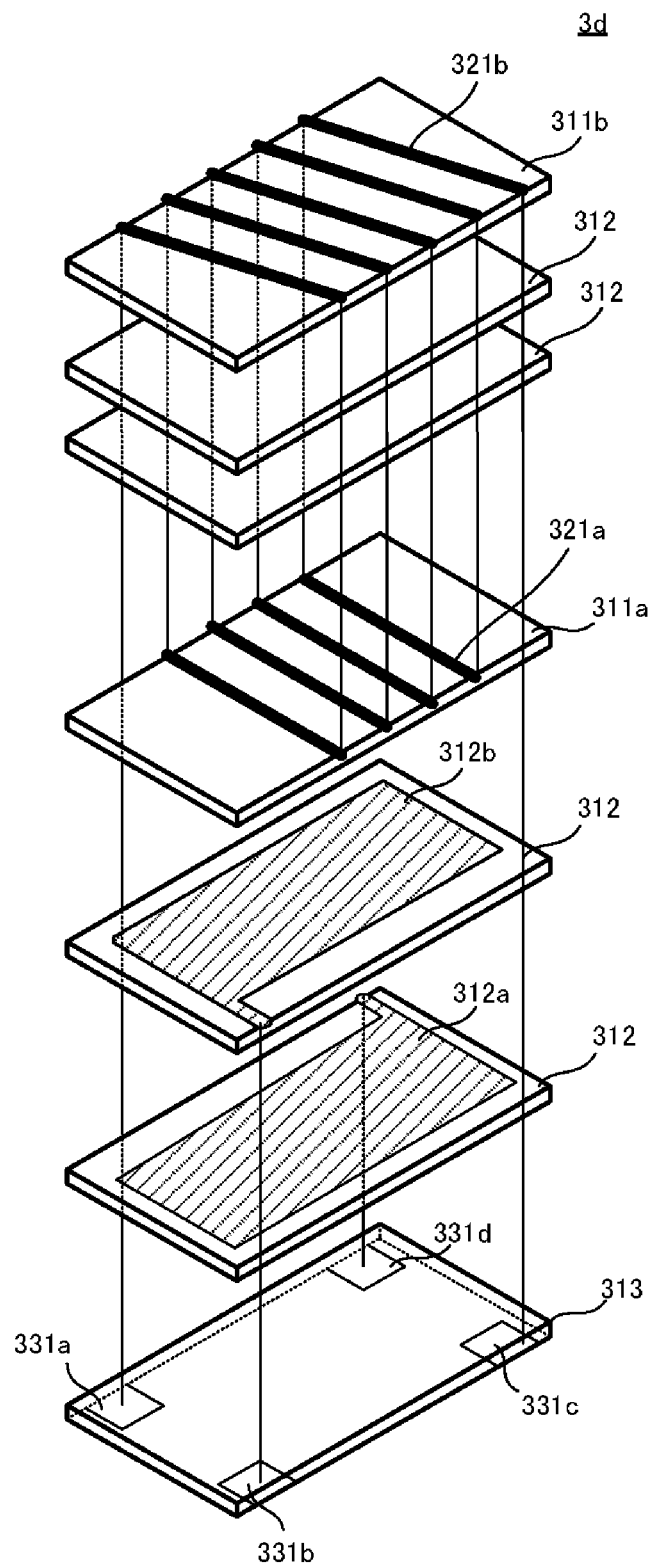
FIG. 23 is an exploded perspective view of a feed coil of another example.

FIG. 23 is an exploded perspective view of a feed coil of another example. A feed coil 3d in this example has a structure in which the magnetic layers 312 on which the plane conductor patterns 312a and 312b are provided are stacked under the non-magnetic layer 311a and magnetic layer 311b on which the in-plane conductors 321a and 321b are provided, the in-plane conductors 321a and 321b being a portion of a coil pattern. That is, the distance from the sheet conductor 2a to the coil of the feed coil 3d is ensured by provided a capacitor between the coil of the feed coil 3d and the sheet conductor 2a. Thus, an influence caused by the sheet conductor 2a is reduced.

Note that the non-magnetic layer 311a may be a magnetic layer. Moreover, a plurality of magnetic layers 312 arranged above the in-plane conductor 321a in FIG. 23 may be replaced with non-magnetic layers. Note that, for each of the layers, whether the layer is a magnetic layer or a non-magnetic layer may be selected as necessary in accordance with a purpose.

Figure 24:
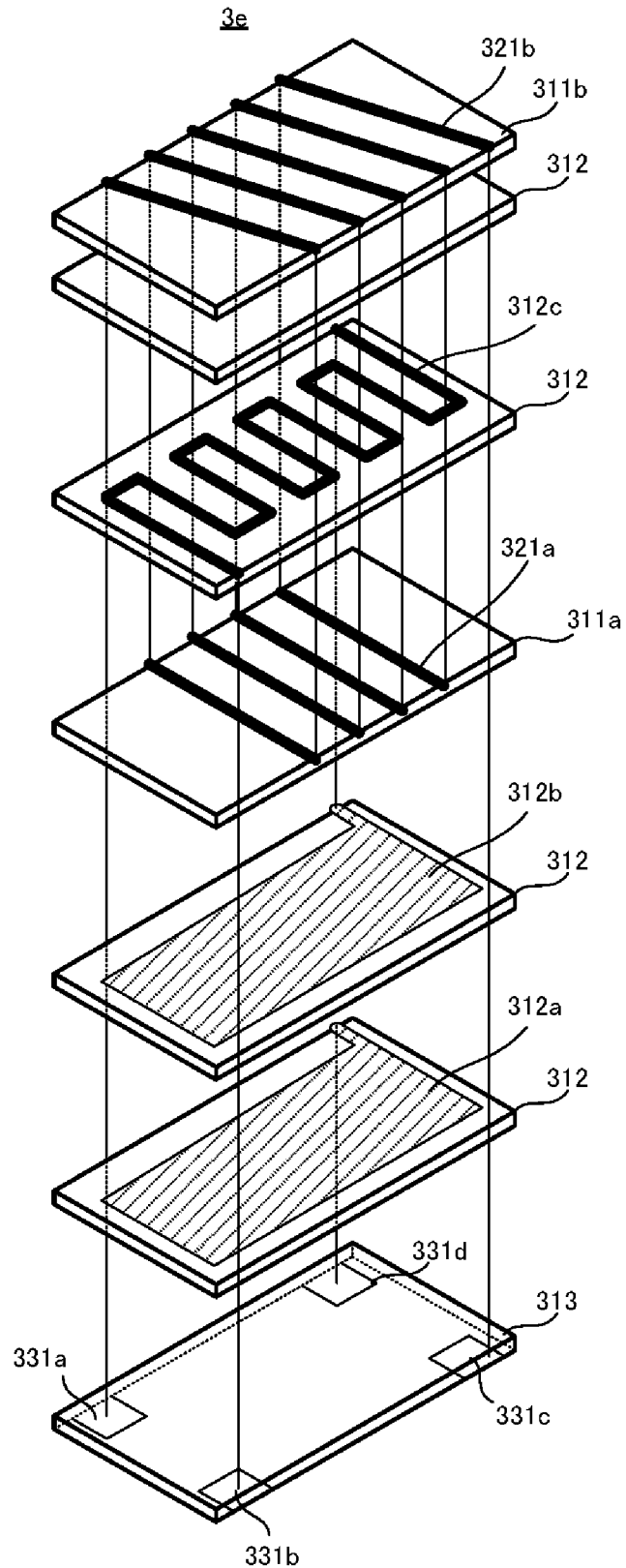
FIG. 24 is an exploded perspective view of a feed coil of another example.
Figure 25:
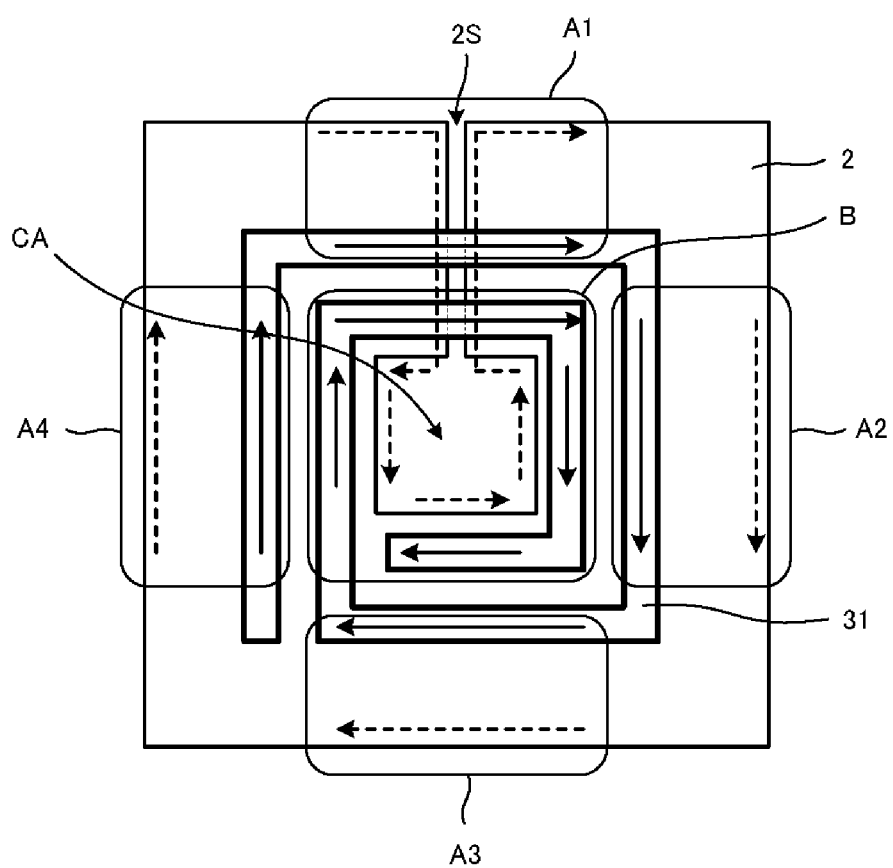
FIG. 25 is a plan view of an antenna device described in Japanese Unexamined Patent Application Publication No. 2011-97657.

FIG. 24 is an exploded perspective view of a feed coil of another example of a preferred embodiment of the present invention. Similarly to the example illustrated in FIG. 23, a feed coil 3e in this example has a structure in which a capacitor is defined by the plane conductor patterns 312a and 312b between the coil of the feed coil 3e and the sheet conductor 2a. Furthermore, an electrode pattern 312c, which substantially has a meandering shape, is provided on one of a plurality of magnetic layers 312 sandwiched between the non-magnetic layer 311a and the magnetic layer 311b, on which the in-plane conductors 321a and 321b are provided, the in-plane conductors 321a and 321b being a portion of a coil pattern. One end of the electrode pattern 312c is electrically connected to the plane conductor pattern 312b, and the other end of the electrode pattern 312c is electrically connected to the input-output terminal 331b by side-surface vias, not illustrated. The plane conductor pattern 312a is electrically connected to the input-output terminal 331d. Note that a plurality of magnetic layers 312 and the magnetic layer 311b may be non-magnetic layers and the non-magnetic layer 311a may be a magnetic layer.

As a result, an LC circuit that includes a capacitor defined by the plane conductor patterns 312a and 312b and an inductor defined by the electrode pattern 312c is connected between the input-output terminals 331b and 331d, the capacitor and the inductor being connected in series. The inductor defined by the electrode pattern 312c may add an inductance value when an inductance value is insufficient due to the opening A, which has been described with reference to FIG. 18A, for example. An LC circuit for which resonance occurs in the carrier-frequency band for a communication signal or near the carrier-frequency band is obtained.

Note that cases in which the antenna devices perform a reception operation have been described in the first to ninth preferred embodiments described above. However, coupling similarly occurs even in cases in which the antenna devices function as transmission antennas in accordance with a law of reciprocity for antennas. That is, a current induced by a magnetic field generated by a feed coil flows in a sheet conductor of an antenna device, so as to generate a magnetic field. Coupling occurs with another antenna, with which communication is performed, through the magnetic field.

Moreover, the antenna devices according to the preferred embodiments of the invention described above preferably include a sheet conductor as a radiator, and thus, communication may be performed with another antenna, with which communication is performed, by orienting either of the main surfaces of the sheet conductor toward the other antenna.

Moreover, the sheet conductor may be arranged between the feed coil and the other antenna, or the feed coil may be arranged between the sheet conductor and the other antenna.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
a feed coil including a coil-shaped conductor; and
a planar conductor having a planar shape; wherein
a slit that extends from a portion of an edge of the planar conductor toward an inner side of the planar conductor is provided in the planar conductor, or an opening and the slit are provided in the planar conductor, the opening being connected to the slit;
a total area of the slit or the slit and the opening is smaller than a total area of the planar conductor;
a portion of a coil-shaped portion of the coil-shaped conductor overlaps the planar conductor;
the feed coil is arranged such that a direction of an axis around which the coil-shaped conductor is disposed differs from a direction perpendicular and a direction substantially perpendicular to the planar conductor;
the feed coil is arranged such that a coil opening at one end of the coil-shaped conductor is adjacent to the slit, or a portion of an edge of the opening and the coil opening faces the slit or the portion of the edge of the opening; and
the feed coil and the planar conductor are coupled to each other through a magnetic field.

2. The antenna device according to claim 1, wherein the slit includes at least one bend portion.

3. The antenna device according to claim 1, wherein the axis around which the coil-shaped conductor is disposed is arranged so as to be perpendicular or substantially perpendicular to the direction in which the slit extends or to a portion of the edge of the opening.

4. The antenna device according to claim 1, wherein
the planar conductor includes a resonant circuit that is primarily defined by the slit or the edge of the opening; and
a resonant frequency of the resonant circuit is substantially the same as a resonant frequency of a circuit that includes the feed coil.

5. The antenna device according to claim 1, wherein at least a portion of the planar conductor is defined by a metal housing.

6. The antenna device according to claim 1, wherein at least a portion of the planar conductor is defined by a ground conductor provided on a circuit board.

7. A wireless communication device comprising:
an antenna device; and
a communication circuit connected to the antenna device; wherein
the antenna device includes a feed coil and a planar conductor, the feed coil including a coil-shaped conductor;
the planar conductor has an area larger than an area of the feed coil;
a slit that extends from a portion of an edge of the planar conductor toward an inner side of the planar conductor is provided in the planar conductor or an opening and the slit are provided in the planar conductor, the opening being connected to the slit;
a total area of the slit or the slit and the opening is smaller than a total area of the planar conductor;
a portion of a coil-shaped portion of the coil-shaped conductor overlaps the planar conductor;
the feed coil is arranged such that a direction of an axis around which the coil-shaped conductor is disposed differs from a direction perpendicular and a direction substantially perpendicular to the planar conductor;
the feed coil is arranged such that a coil opening at one end of the coil-shaped conductor is close to the slit or a portion of an edge of the opening and the coil opening faces the slit or the portion of the edge of the opening; and the feed coil and the planar conductor are coupled to each other through a magnetic field.

8. The wireless communication device according to claim 7, wherein the slit includes at least one bend portion.

9. The wireless communication device according to claim 7, wherein the axis around which the coil-shaped conductor is disposed is arranged so as to be perpendicular or substantially perpendicular to the direction in which the slit extends or to a portion of the edge of the opening.

10. The wireless communication device according to claim 7, wherein
the planar conductor includes a resonant circuit that is primarily defined by the slit or the edge of the opening; and
a resonant frequency of the resonant circuit is substantially the same as a resonant frequency of a circuit that includes the feed coil.

11. The wireless communication device according to claim 7, wherein at least a portion of the planar conductor is defined by a metal housing.

12. The wireless communication device according to claim 7, wherein at least a portion of the planar conductor is defined by a ground conductor provided on a circuit board.

13. The antenna device according to claim 1, wherein at least a portion of the feed coil overlaps the planar conductor when viewed in a direction perpendicular to the sheet conductor.

14. The antenna device according to claim 1, wherein an area of the opening or the slit is less than an area of the planar conductor.

15. The wireless communication device according to claim 7, wherein at least a portion of the feed coil overlaps the planar conductor when viewed in a direction perpendicular to the planar conductor.

16. The wireless communication device according to claim 7, wherein an area of the opening or the slit is less than an area of the planar conductor.

\* \* \* \* \*